United States Patent
Rico Alvarino et al.

(10) Patent No.: US 11,576,215 B2
(45) Date of Patent: Feb. 7, 2023

(54) RANDOM ACCESS RESOURCES BASED ON NETWORK CONDITIONS

(71) Applicant: QUALCOMM Incorporated, San Diego, CA (US)

(72) Inventors: Alberto Rico Alvarino, San Diego, CA (US); Le Liu, Fremont, CA (US); Umesh Phuyal, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 39 days.

(21) Appl. No.: 17/360,744

(22) Filed: Jun. 28, 2021

(65) Prior Publication Data

US 2021/0410199 A1    Dec. 30, 2021

Related U.S. Application Data

(60) Provisional application No. 63/046,532, filed on Jun. 30, 2020.

(51) Int. Cl.
*H04W 74/08* (2009.01)
*H04W 72/02* (2009.01)
*H04W 74/00* (2009.01)

(52) U.S. Cl.
CPC ....... *H04W 74/0841* (2013.01); *H04W 72/02* (2013.01); *H04W 74/008* (2013.01); *H04W 74/0816* (2013.01)

(58) Field of Classification Search
None
See application file for complete search history.

*Primary Examiner* — James P Duffy
(74) *Attorney, Agent, or Firm* — Holland & Hart LLP

(57) ABSTRACT

Methods, systems, and devices for wireless communications are described for allocating additional random access channel (RACH) resources. A user equipment (UE) may transmit a random access request to a base station. The base station may respond to the random access request with a random access response or other signaling that indicates additional RACH resources for a second random access request. The UE may select a resource from the additional RACH resources to transmit the second random access request. The network may also configure additional RACH resources for peak times and may indicate the additional RACH resources to the UE. The UE may select a resource from the additional RACH resources or baseline RACH resources and may use the selected resource to transmit a random access request.

30 Claims, 16 Drawing Sheets

RANDOM ACCESS RESOURCES BASED ON NETWORK CONDITIONS

CROSS REFERENCE

The present application for patent claims the benefit of U.S. Provisional Patent Application No. 63/046,532 by RICO ALVARINO et al., entitled "RANDOM ACCESS RESOURCES BASED ON NETWORK CONDITIONS," filed Jun. 30, 2020, assigned to the assignee hereof, and expressly incorporated by reference herein.

FIELD OF TECHNOLOGY

The following relates generally to wireless communications and to random access resources based on network conditions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support random access resources based on network conditions. Generally, the described techniques provide for allocating additional or increased random access channel (RACH) resources in a flexible manner, which may decrease overhead associated with the additional RACH resources and may also decrease latency of RACH procedures during periods of network congestion. In a first example, a user equipment (UE) may transmit a random access request to a base station during a peak network usage time, which may contribute to congestion at the network. The base station may identify the congestion and may respond to the random access request with a random access response or other signaling that indicates additional RACH resources for retransmission of the random access request or for transmission of one or more other random access requests. The UE may select a resource from the additional RACH resources and may use the selected resource to retransmit the random access request or to transmit one or more additional random access requests.

In a second example (e.g., additionally or alternatively), the network may configure (e.g., preconfigure) additional RACH resources for known or estimated peak times. In one example, the base station may indicate baseline RACH resources and the additional RACH resources via a same system information (e.g., a system information block (SIB) or system information message), and may also indicate, via the system information, a time duration or a time period that applies to the additional RACH resources. In another example, the base station may indicate the baseline RACH resources via system information (e.g., a first SIB) and may indicate the additional RACH resources via a different or additional system information (e.g., a second SIB or second system information message). In some examples, the additional system information may include less information than the first system information (e.g., may be an abbreviated SIB or may not include an entire SIB), such that the UE may use less power and incur less latency when acquiring the second system information. The second system information may be acquired by the UE within a time window (e.g., X seconds) before performing a random access procedure.

The UE may receive the indication of the additional RACH resources and may transmit a random access request using the additional RACH resources. The additional RACH resources may reduce a probability of collisions, reduce network congestion due to a larger amount of available RACH resources, reduce a latency for performing a random access procedure (e.g., during times of network congestion), or any combination thereof.

A method of wireless communication at a UE is described. The method may include receiving, from a base station and via a system information message, a first indication of a first set of resources for a RACH, transmitting a random access request via a first resource of the first set of resources based on the first indication, receiving, from the base station and in response to transmitting the random access request, a second indication of a second set of resources for the RACH different than the first set of resources, and transmitting a second random access request via a second resource of the second set of resources.

An apparatus for wireless communication at a UE is described. The apparatus may include a processor, memory coupled with the processor, and instructions stored in the memory. The instructions may be executable by the processor to cause the apparatus to receive, from a base station and via a system information message, a first indication of a first set of resources for a RACH, transmit a random access request via a first resource of the first set of resources based on the first indication, receive, from the base station and in response to transmitting the random access request, a second indication of a second set of resources for the RACH different than the first set of resources, and transmit a second random access request via a second resource of the second set of resources.

Another apparatus for wireless communication at a UE is described. The apparatus may include means for receiving, from a base station and via a system information message, a first indication of a first set of resources for a RACH, transmitting a random access request via a first resource of the first set of resources based on the first indication, receiving, from the base station and in response to transmitting the random access request, a second indication of a second set of resources for the RACH different than the first set of resources, and transmitting a second random access request via a second resource of the second set of resources.

A non-transitory computer-readable medium storing code for wireless communication at a UE is described. The code may include instructions executable by a processor to receive, from a base station and via a system information message, a first indication of a first set of resources for a RACH, transmit a random access request via a first resource of the first set of resources based on the first indication, receive, from the base station and in response to transmitting the random access request, a second indication of a second set of resources for the RACH different than the first set of resources, and transmit a second random access request via a second resource of the second set of resources.

In some examples of the method, apparatuses, and non-transitory computer-readable medium described herein, the second set of resources may be based on a congestion associated with a network.

Some examples of the method, apparatuses, and non-transitory computer-readable medium described herein may further include operations, features, means, or instructions for receiving, via the system information message, an indication of one or more sets of resources for the RACH, the one or more sets of resources different than the first set of resources and including the second set of resources, and receiving, via the second indication, an indication of at least one set of the one or more sets of resources, the at least one set of resources including the second set of resources.

In some examples of the method, apparatuses, and non-transitory computer-readable medium described herein, the indication of the at least one set of resources includes a field dedicated to indicating the at least one set of resources.

In some examples of the method, apparatuses, and non-transitory computer-readable medium described herein, the indication of the at least one set of resources includes a field indicating one or more other parameters for transmitting the second random access request.

In some examples of the method, apparatuses, and non-transitory computer-readable medium described herein, the second set of resources may be based on one or more coverage levels, one or more communication beams, one or more frequency carriers, or any combination thereof associated with the second set of resources.

In some examples of the method, apparatuses, and non-transitory computer-readable medium described herein, the second indication includes information about time resources and frequency resources, one or more frequency carriers, or any combination thereof of the second set of resources.

Some examples of the method, apparatuses, and non-transitory computer-readable medium described herein may further include operations, features, means, or instructions for using a tracking parameter to determine when to cease random access request transmissions using the second set of resources based on receiving the second indication, where transmitting the second random access request may be based on initiating the tracking parameter.

Some examples of the method, apparatuses, and non-transitory computer-readable medium described herein may further include operations, features, means, or instructions for determining that the tracking parameter satisfies a threshold based on initiating the tracking parameter, and transmitting a third random access request via a third resource of the first set of resources based on the tracking parameter satisfying the threshold.

Some examples of the method, apparatuses, and non-transitory computer-readable medium described herein may further include operations, features, means, or instructions for receiving the threshold via the second indication, the system information message, or any combination thereof, where determining that the tracking parameter may be satisfied may be based on receiving the threshold.

Some examples of the method, apparatuses, and non-transitory computer-readable medium described herein may further include operations, features, means, or instructions for modifying a value of the tracking parameter based on transmitting the second random access request, where the tracking parameter includes a counter that represents a quantity of retransmissions of the random access request.

In some examples of the method, apparatuses, and non-transitory computer-readable medium described herein, the tracking parameter includes a timer that represents a quantity of time that the second set of resources may be available for the random access request transmissions via the second set of resources.

Some examples of the method, apparatuses, and non-transitory computer-readable medium described herein may further include operations, features, means, or instructions for receiving, from the base station and based on transmitting the second random access request, a third indication of a third set of resources for the RACH different than the first set of resources, and restarting the tracking parameter based on receiving the third indication.

Some examples of the method, apparatuses, and non-transitory computer-readable medium described herein may further include operations, features, means, or instructions for identifying a first backoff time associated with the first set of resources based on receiving the second indication, and adjusting the first backoff time to a second backoff time for the second set of resources using a scaling factor, where transmitting the second random access request in based on the second backoff time.

Some examples of the method, apparatuses, and non-transitory computer-readable medium described herein may further include operations, features, means, or instructions for selecting a resource included in the first set of resources and the second set of resources for transmission of the second random access request, and setting the second backoff time to the first backoff time based on the resource being included in the first set of resources and the second set of resources.

Some examples of the method, apparatuses, and non-transitory computer-readable medium described herein may further include operations, features, means, or instructions for identifying a backoff time for the second set of resources based on a field of the second indication, the field including an indication of the second set of resources and the backoff time, where transmitting the second random access request in based on the backoff time.

Some examples of the method, apparatuses, and non-transitory computer-readable medium described herein may further include operations, features, means, or instructions for identifying a backoff time associated with the first set of resources based on receiving the second indication, and refraining from using the backoff time for the second set of resources based on receiving the second indication of the second set of resources, where transmitting the second random access request in based on the refraining.

In some examples of the method, apparatuses, and non-transitory computer-readable medium described herein, a field that includes the second indication of the second set of resources further includes a backoff indicator that indicates a backoff time associated with retransmissions of the random access request using the first set of resources.

In some examples of the method, apparatuses, and non-transitory computer-readable medium described herein, a first field of a message includes the second indication of the second set of resources, and a second field of the message includes a backoff indicator that indicates a backoff time associated with retransmissions of the random access request using the first set of resources.

Some examples of the method, apparatuses, and non-transitory computer-readable medium described herein may further include operations, features, means, or instructions for determining a transmit power for the second random access request based on using the second set of resources, where transmitting the second random access request may be based on determining the transmit power, and determining a value of a counter for the second random access request based on using the second set of resources, where the counter represents a quantity of random access request transmissions, where transmitting the second random access request may be based on determining the value of the counter.

In some examples of the method, apparatuses, and non-transitory computer-readable medium described herein, determining the transmit power for the second random access request may include operations, features, means, or instructions for increasing the transmit power of the second random access request as compared with a transmit power associated with transmission of the random access request; or using a same transmit power for the second random access request as the transmit power associated with transmission of the random access request.

In some examples of the method, apparatuses, and non-transitory computer-readable medium described herein, the transmit power for the second random access request may be based on the counter for the transmit power.

In some examples of the method, apparatuses, and non-transitory computer-readable medium described herein, determining the value of the counter for the second random access request may include operations, features, means, or instructions for incrementing the value of the counter after transmitting the random access request; or maintaining the value of the counter after transmitting the random access request.

In some examples of the method, apparatuses, and non-transitory computer-readable medium described herein, determining the value of the counter for the second random access request may include operations, features, means, or instructions for determining to reset the value of the counter based on receiving the second indication.

Some examples of the method, apparatuses, and non-transitory computer-readable medium described herein may further include operations, features, means, or instructions for determining a coverage enhancement level for the second random access request based on using the second set of resources, where transmitting the second random access request may be based on determining the coverage enhancement level.

In some examples of the method, apparatuses, and non-transitory computer-readable medium described herein, determining the coverage enhancement level for the second random access request may include operations, features, means, or instructions for increasing the coverage enhancement level of the second random access request as compared with a coverage enhancement level associated with transmission of the random access request; or using a same coverage enhancement level for the second random access request as the coverage enhancement level associated with transmission of the random access request.

In some examples of the method, apparatuses, and non-transitory computer-readable medium described herein, the coverage enhancement level for the second random access request may be based on a value of a counter for the coverage enhancement level.

Some examples of the method, apparatuses, and non-transitory computer-readable medium described herein may further include operations, features, means, or instructions for transmitting the second random access request via the second resource of the second set of resources may be based on a type of the UE, a capability of the UE, an access class of the UE, a traffic type of communications at the UE, or any combination thereof.

In some examples of the method, apparatuses, and non-transitory computer-readable medium described herein, the second set of resources includes the first set of resources.

In some examples of the method, apparatuses, and non-transitory computer-readable medium described herein, the second indication includes a random access response, a control message, configuration signaling, or any combination thereof.

Some examples of the method, apparatuses, and non-transitory computer-readable medium described herein may further include operations, features, means, or instructions for determining a modified random access radio network temporary identifier associated with a random access response to the second random access request based on transmitting the second random access request via the second set of resources.

In some examples of the method, apparatuses, and non-transitory computer-readable medium described herein, a random access preamble identifier for a random access response may be based on whether an associated random access request may be transmitted via the first set of resources or the second set of resources.

A method of wireless communication at a base station is described. The method may include transmitting, via a system information message, a first indication of a first set of resources for a RACH, receiving, from a UE, a random access request via a first resource of the first set of resources, identifying a second set of resources for the RACH based on receiving the random access request, transmitting, to the UE and in response to receiving the random access request, a second indication of the second set of resources, and receiving a second random access request via a second resource of the second set of resources.

An apparatus for wireless communication at a base station is described. The apparatus may include a processor, memory coupled with the processor, and instructions stored in the memory. The instructions may be executable by the processor to cause the apparatus to transmit, via a system information message, a first indication of a first set of resources for a RACH, receive, from a UE, a random access request via a first resource of the first set of resources, identify a second set of resources for the RACH based on receiving the random access request, transmit, to the UE and in response to receiving the random access request, a second indication of the second set of resources, and receive a second random access request via a second resource of the second set of resources.

Another apparatus for wireless communication at a base station is described. The apparatus may include means for transmitting, via a system information message, a first indication of a first set of resources for a RACH, receiving, from a UE, a random access request via a first resource of the first set of resources, identifying a second set of resources for the RACH based on receiving the random access request, transmitting, to the UE and in response to receiving the random access request, a second indication of the second set of resources, and receiving a second random access request via a second resource of the second set of resources.

A non-transitory computer-readable medium storing code for wireless communication at a base station is described.

The code may include instructions executable by a processor to transmit, via a system information message, a first indication of a first set of resources for a RACH, receive, from a UE, a random access request via a first resource of the first set of resources, identify a second set of resources for the RACH based on receiving the random access request, transmit, to the UE and in response to receiving the random access request, a second indication of the second set of resources, and receive a second random access request via a second resource of the second set of resources.

In some examples of the method, apparatuses, and non-transitory computer-readable medium described herein, the second set of resources may be based on a congestion associated with a network.

Some examples of the method, apparatuses, and non-transitory computer-readable medium described herein may further include operations, features, means, or instructions for transmitting, via the system information message, an indication of one or more sets of resources for the RACH, the one or more sets of resources different than the first set of resources and including the second set of resources, and transmitting, via the second indication, an indication of at least one set of the one or more sets of resources, the at least one set of resources including the second set of resources.

In some examples of the method, apparatuses, and non-transitory computer-readable medium described herein, the indication of the at least one set of resources includes a field dedicated to indicating the at least one set of resources.

In some examples of the method, apparatuses, and non-transitory computer-readable medium described herein, the indication of the at least one set of resources includes a field indicating one or more other parameters for transmitting the second random access request.

In some examples of the method, apparatuses, and non-transitory computer-readable medium described herein, the second set of resources may be based on one or more coverage levels, one or more communication beams, one or more frequency carriers, or any combination thereof associated with the second set of resources.

In some examples of the method, apparatuses, and non-transitory computer-readable medium described herein, the second indication includes information about time resources and frequency resources, one or more frequency carriers, or any combination thereof of the second set of resources.

Some examples of the method, apparatuses, and non-transitory computer-readable medium described herein may further include operations, features, means, or instructions for transmitting a threshold for a tracking parameter to determine when to cease random access request transmissions using the second set of resources, where receiving the second random access request may be based on transmitting the threshold.

In some examples of the method, apparatuses, and non-transitory computer-readable medium described herein, the tracking parameter includes a counter that represents a quantity of retransmissions of the random access request.

In some examples of the method, apparatuses, and non-transitory computer-readable medium described herein, the tracking parameter includes a timer that represents a quantity of time that the second set of resources may be available for the random access request transmissions via the second set of resources.

Some examples of the method, apparatuses, and non-transitory computer-readable medium described herein may further include operations, features, means, or instructions for transmitting, via a field of the second indication, an indication of a backoff time associated with the first set of resources, where receiving the second random access request may be based on the backoff time.

In some examples of the method, apparatuses, and non-transitory computer-readable medium described herein, the second set of resources includes the first set of resources.

In some examples of the method, apparatuses, and non-transitory computer-readable medium described herein, the second indication includes a random access response, a control message, configuration signaling, or any combination thereof.

Some examples of the method, apparatuses, and non-transitory computer-readable medium described herein may further include operations, features, means, or instructions for determining a modified random access radio network temporary identifier associated with a random access response to the second random access request based on receiving the second random access request via the second set of resources.

In some examples of the method, apparatuses, and non-transitory computer-readable medium described herein, a random access preamble identifier for a random access response may be based on whether an associated random access request may be received via the first set of resources or the second set of resources.

A method of wireless communication at a UE is described. The method may include receiving, from a base station and via a system information message, a first indication of a first set of resources configured for a first time duration for a RACH, receiving, from the base station, a second indication of a second set of resources configured for a second time duration for the RACH, the second time duration different from the first time duration and the second set of resources different than the first set of resources, determining whether to transmit a random access request via a first resource of the first set of resources or via a second resource of the second set of resources based on being within the first time duration or the second time duration, and transmitting the random access request based on the determining.

An apparatus for wireless communication at a UE is described. The apparatus may include a processor, memory coupled with the processor, and instructions stored in the memory. The instructions may be executable by the processor to cause the apparatus to receive, from a base station and via a system information message, a first indication of a first set of resources configured for a first time duration for a RACH, receive, from the base station, a second indication of a second set of resources configured for a second time duration for the RACH, the second time duration different from the first time duration and the second set of resources different than the first set of resources, determine whether to transmit a random access request via a first resource of the first set of resources or via a second resource of the second set of resources based on being within the first time duration or the second time duration, and transmit the random access request based on the determining.

Another apparatus for wireless communication at a UE is described. The apparatus may include means for receiving, from a base station and via a system information message, a first indication of a first set of resources configured for a first time duration for a RACH, receiving, from the base station, a second indication of a second set of resources configured for a second time duration for the RACH, the second time duration different from the first time duration and the second set of resources different than the first set of resources, determining whether to transmit a random access request via a first resource of the first set of resources or via a second resource of the second set of resources based on being within the first time duration or the second time duration, and transmitting the random access request based on the determining.

A non-transitory computer-readable medium storing code for wireless communication at a UE is described. The code may include instructions executable by a processor to receive, from a base station and via a system information message, a first indication of a first set of resources configured for a first time duration for a RACH, receive, from the base station, a second indication of a second set of resources configured for a second time duration for the RACH, the second time duration different from the first time duration and the second set of resources different than the first set of resources, determine whether to transmit a random access request via a first resource of the first set of resources or via a second resource of the second set of resources based on being within the first time duration or the second time duration, and transmit the random access request based on the determining.

In some examples of the method, apparatuses, and non-transitory computer-readable medium described herein, the second set of resources may be based on a congestion associated with a network.

Some examples of the method, apparatuses, and non-transitory computer-readable medium described herein may further include operations, features, means, or instructions for monitoring for a second system information message within a time window before transmitting the random access request, where receiving the second indication of the second set of resources is based on monitoring for the second system information message.

Some examples of the method, apparatuses, and non-transitory computer-readable medium described herein may further include operations, features, means, or instructions for receiving a master information block (MIB) indicating whether the second system information message may be active, where receiving the second indication may be based on whether the second system information message may be active.

In some examples of the method, apparatuses, and non-transitory computer-readable medium described herein, the first set of resources include a default set of resources for the RACH, and the second time duration for using the second set of resources may be within the first time duration associated with the default set of resources.

In some examples of the method, apparatuses, and non-transitory computer-readable medium described herein, the second indication of the second set of resources includes a portion of the system information message.

In some examples of the method, apparatuses, and non-transitory computer-readable medium described herein, the second indication of the second set of resources includes a second system information message.

In some examples of the method, apparatuses, and non-transitory computer-readable medium described herein, the first time duration and the second time duration each include one or more frame numbers.

A method of wireless communication at a base station is described. The method may include transmitting a system information message indicating a first set of resources configured for a first time duration for a RACH, identifying a second set of resources configured for a second time duration for the RACH, the second set of resources different than the first set of resources and the second time duration different than the first time duration, transmitting an indication of the second set of resources, and receiving, from a UE, a random access request via a resource selected from the first set of resources or the second set of resources based on being within the first time duration or the second time duration.

An apparatus for wireless communication at a base station is described. The apparatus may include a processor, memory coupled with the processor, and instructions stored in the memory. The instructions may be executable by the processor to cause the apparatus to transmit a system information message indicating a first set of resources configured for a first time duration for a RACH, identify a second set of resources configured for a second time duration for the RACH, the second set of resources different than the first set of resources and the second time duration different than the first time duration, transmit an indication of the second set of resources, and receive, from a UE, a random access request via a resource selected from the first set of resources or the second set of resources based on being within the first time duration or the second time duration.

Another apparatus for wireless communication at a base station is described. The apparatus may include means for transmitting a system information message indicating a first set of resources configured for a first time duration for a RACH, identifying a second set of resources configured for a second time duration for the RACH, the second set of resources different than the first set of resources and the second time duration different than the first time duration, transmitting an indication of the second set of resources, and receiving, from a UE, a random access request via a resource selected from the first set of resources or the second set of resources based on being within the first time duration or the second time duration.

A non-transitory computer-readable medium storing code for wireless communication at a base station is described. The code may include instructions executable by a processor to transmit a system information message indicating a first set of resources configured for a first time duration for a RACH, identify a second set of resources configured for a second time duration for the RACH, the second set of resources different than the first set of resources and the second time duration different than the first time duration, transmit an indication of the second set of resources, and receive, from a UE, a random access request via a resource selected from the first set of resources or the second set of resources based on being within the first time duration or the second time duration.

In some examples of the method, apparatuses, and non-transitory computer-readable medium described herein, the second set of resources may be based on a congestion associated with a network.

In some examples of the method, apparatuses, and non-transitory computer-readable medium described herein, the first set of resources include a default set of resources for the RACH, and the second time duration for using the second set of resources may be within the first time duration associated with the default set of resources.

In some examples of the method, apparatuses, and non-transitory computer-readable medium described herein, the indication of the second set of resources includes a portion of the system information message.

In some examples of the method, apparatuses, and non-transitory computer-readable medium described herein, the indication of the second set of resources includes a second system information message.

In some examples of the method, apparatuses, and non-transitory computer-readable medium described herein transmitting the indication of the second set of resources includes transmitting a second system information message within a time window before the second set of resources, the second system information message including the indication of the second set of resources.

Some examples of the method, apparatuses, and non-transitory computer-readable medium described herein may further include operations, features, means, or instructions for transmitting a MIB indicating whether the second system information message may be active, where transmitting the indication may be based on whether the second system information message may be active.

In some examples of the method, apparatuses, and non-transitory computer-readable medium described herein, the first time duration and the second time duration each include one or more frame numbers.

DETAILED DESCRIPTION

Figure 1:
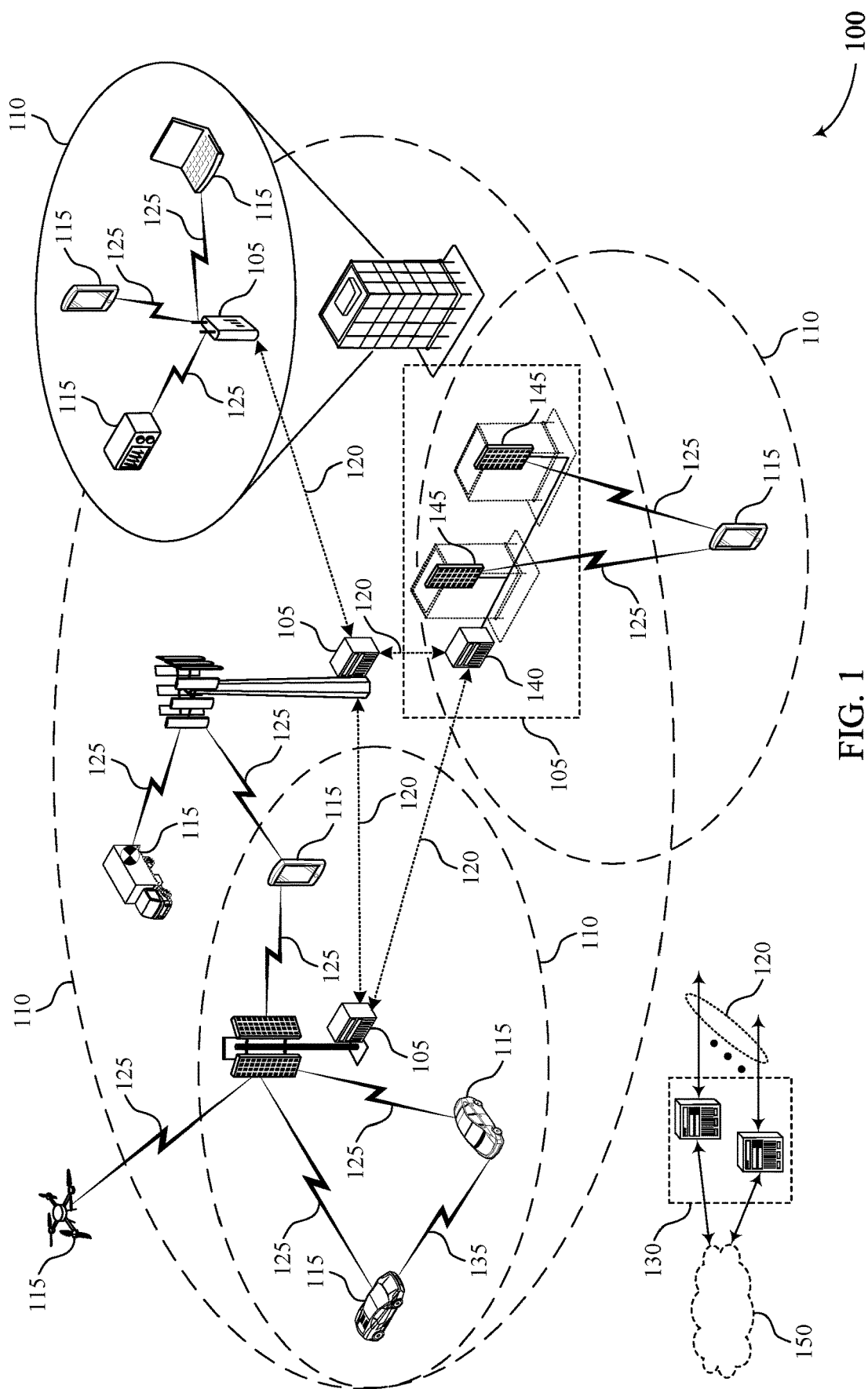
FIG. 1 illustrates an example of a wireless communications system that supports random access resources based on network conditions in accordance with aspects of the present disclosure.

A user equipment (UE) and a base station may perform a random access procedure, for example, when a UE is establishing a link or requesting new resources within a wireless network. In some cases, the network may experience a relatively higher amount of wireless communications traffic for random access procedures (e.g., higher congestion). For example, some communications may be associated with a burst of traffic (e.g., "bursty" traffic) from multiple devices that are requesting access to the network during a same duration. When bursty random access channel (RACH) traffic occurs, the network may experience congestion (albeit temporary congestion) and may have insufficient RACH resources (e.g., baseline RACH resources) to accommodate one or more random access requests.

If the network allocates additional RACH resources to decrease the congestion, an amount of signaling overhead may increase for indicating the additional RACH resources, and some of the additional RACH resources may go unused during non-peak times and may decrease available communication resources. If the network changes the configuration of the RACH resources to increase an amount of RACH resources during bursts of traffic (e.g., during peak times), the system information may change, which may increase power consumption and communication latency at wireless devices resulting from acquiring the new system information. If the network does not allocate additional RACH resources, the congestion at the network during peak times may result in collisions, decreased communication quality, and increased latency.

The present disclosure provides techniques for allocating additional or increased RACH resources in a flexible manner, which may decrease overhead associated with the additional RACH resources, may decrease network congestion, may decrease a latency of a random access procedure during periods of high-network traffic, or any combination thereof. In a first example, the UE may transmit a random access request to the base station during a peak time, which may contribute to congestion at the network. The base station may identify the congestion and may respond to the random access request with a random access response, or other signaling, that indicates additional RACH resources for retransmission of the random access request or for transmission of one or more other random access requests.

The UE may select a resource from the additional RACH resources and may use the selected resource to retransmit the random access request or to transmit one or more additional random access requests. The additional RACH resources may be temporarily configured (e.g., for a period of time) from uplink channel resources and may reduce a probability of collisions and network congestion due to a larger amount of available RACH resources.

In a second example (e.g., additionally or alternatively), the network may configure (e.g., preconfigure) additional RACH resources for known or estimated peak times. For example, the network may receive information (e.g., on a periodic basis, such as a weekly basis) from a utility company, bike company, or any other operator, indicating peak times for that operator. Additionally or alternatively, the network may estimate peak times based on past network activity. In one example, the base station may indicate baseline RACH resources and the additional RACH resources via a same system information (e.g., a system information block (SIB) or system information message), and may also indicate, via the system information, a time duration or a time period that applies to the additional RACH resources.

In another example, the base station may indicate the baseline RACH resources via system information (e.g., a first SIB or first system information message) and may indicate the additional RACH resources via a different or additional system information (e.g., a second SIB or second system information message), which may include less information than the first system information (e.g., may be an abbreviated SIB or may not include an entire SIB), such that the UE may use less power and incur less latency when acquiring the second system information. The second system information may be acquired by the UE within a time window before performing a random access procedure.

The UE may receive the indication of the baseline RACH resources and the indication of the additional RACH resources and may transmit a random access request using the additional RACH resources (e.g., based on a network congestion or a time period for the additional RACH resources). The additional RACH resources may reduce a probability of collisions and network congestion due to a larger amount of available RACH resources.

Aspects of the disclosure are initially described in the context of wireless communications systems. Aspects of the disclosure are further illustrated by and described with reference to resource allocation schemes, a process flow, apparatus diagrams, system diagrams, and flowcharts that relate to random access resources based on network conditions.

FIG. 1 illustrates an example of a wireless communications system 100 that supports random access resources based on network conditions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Figure 2:
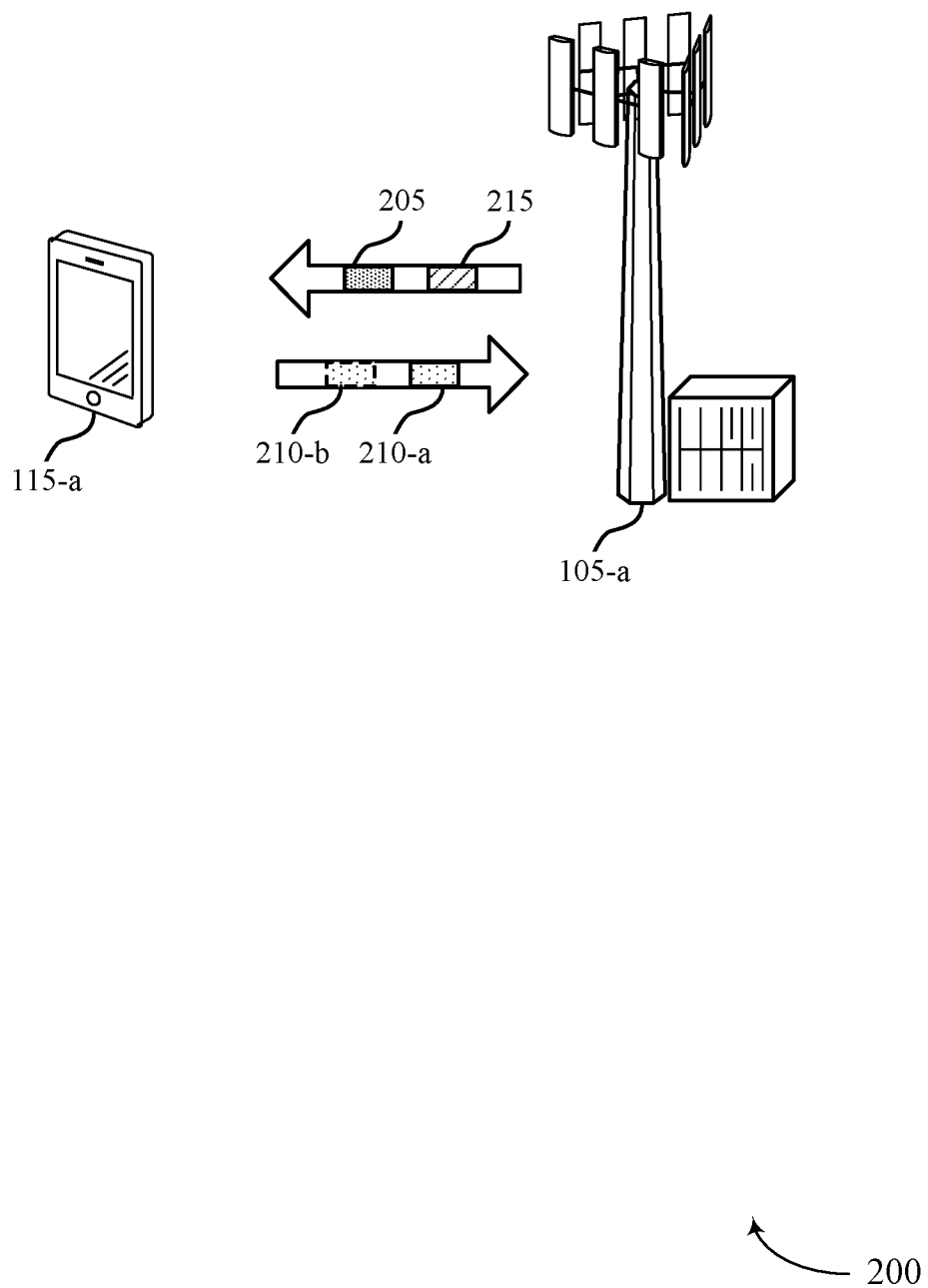
FIG. 2 illustrates an example of a wireless communications system that supports random access resources based on network conditions in accordance with aspects of the present disclosure.

A UE 115 may transmit a random access request to a base station 105. The base station 105 may respond to the random access request with a random access response or other signaling that indicates additional RACH resources for a second random access request. The UE 115 may select a resource from the additional RACH resources and may use the selected resource to transmit the second random access request. The network may also configure additional RACH resources for peak times and may indicate the additional RACH resources to the UE 115, as well as a time duration that applies to the additional RACH resources. The UE 115 may select a resource from the additional RACH resources or baseline RACH resources and may use the selected resource to transmit a random access request FIG. 2 illustrates an example of a wireless communications system 200 that supports random access resources based on network conditions in accordance with aspects of the present disclosure. In some examples, wireless communications system 200 may implement aspects of wireless communications system 100. For example, wireless communications system may include a UE 115-a and a base station 105-a, which may represent examples of a UE 115 and a base station 105 described with reference to FIG. 1.

The UE 115-a and base station 105-a may perform a random access procedure, for example, when a network (e.g., including or included in wireless communications system 200) may experience a relatively higher amount of wireless communications traffic for random access procedures (e.g., higher congestion).

In some cases, base station 105-a may communicate with multiple UEs 115-a (e.g., such as IoT devices). Some communications, such as IoT communications, may represent communications between a relatively large number of IoT devices (e.g., including UE 115-a) and base station 105-a. In some cases, the communications may include a relatively small number of wireless transactions, such that a RACH procedure may represent a limiting factor in the IoT communications. In addition, some communications (such as IoT communications) may be associated with a burst of traffic (e.g., "bursty" traffic) from multiple IoT devices for access to the network.

In a first example of a circumstance that may involve "bursty" traffic, the IoT devices may represent bike locks at a train station, where a burst in traffic may accompany an arrival of a train and a larger amount of bike accesses. In a second example of a circumstance that may involve "bursty" traffic, the IoT devices may represent utility meters that may be configured to report at a same time (e.g., or within a same time period), which may result in a burst of traffic. In each of these examples, there may exist periods of relative inactivity by the UEs 115 (e.g., including UE 115-a), during which network access is not used, and other times of high activity by the UEs 115-a, during which the network may be in higher demand. While the examples herein describe bursts of traffic associated with IoT devices, it is to be understood that such examples are not limited to IoT devices. For example, bursts of traffic may result from other types of communication with other types of devices and similar solutions may be applied to such bursts of traffic.

When bursty RACH traffic occurs, the network may experience congestion and may have insufficient RACH resources (e.g., baseline RACH resources) to accommodate a random access request from each IoT device. If the network allocates additional RACH resources to decrease the congestion, an amount of signaling overhead may increase for indicating the additional RACH resources (e.g., via a SIB), and some of the additional RACH resources may go unused (e.g., at some times), which may decrease a total amount of used, available communication resources. If the network changes the configuration of the RACH resources to increase an amount of RACH resources during bursts of traffic (e.g., during peak times), the system information (e.g., in a SIB) may change, which may increase power consumption and communication latency at the IoT devices resulting from acquiring the new system information. For example, some UEs 115 (e.g., IoT devices) may acquire system information as little as once a day in order to conserve power. If the network does not allocate additional RACH resources, the congestion at the network during peak times may result in collisions, decreased communication quality, and increased latency.

The present disclosure provides techniques for allocating additional or increased RACH resources in a flexible manner, which may decrease overhead associated with the additional RACH resources and may also decrease network congestion. In a first example, UE 115-a may transmit a random access request 210 (e.g., random access request 210-a) to base station 105-a during a peak time and using a first set of resources (e.g., RACH resources), which may contribute to congestion at the network. Base station 105-a may identify the congestion and may respond to the random access request 210 with a random access response or other signaling (e.g., a second indication 215) that indicates additional RACH resources (e.g., a second set of resources) for retransmission of the random access request 210 or for transmission of one or more other random access requests 210. By dynamically (or temporarily) expanding the set of resources allocated to RACH procedures, a latency associated with the RACH procedures may be reduced, especially during periods of high network traffic.

In some cases, the second indication 215 may be included in a random access response, or in other signaling in response to the random access request. For example, the second indication 215 may be included in downlink control information (DCI) for a random access message 2 (msg2), a random access message 3 (msg3) retransmission, or a random access message 4 (msg4). The second indication 215 may additionally or alternatively be included in a physical downlink channel (e.g., physical downlink shared channel (PDSCH)) for msg4, or in radio resource control (RRC) signaling for a handover (e.g., in handover information). In some cases, a DCI for a downlink control channel (e.g., a physical downlink control channel (PDCCH) order for connected mode random access) may include the second indication 215.

Base station 105-a may configure UE 115-a with the baseline RACH resources via a first indication 205 (e.g., via system information, such as a SIB), and UE 115-a may select (e.g., randomly select, such as via a medium access control (MAC) layer) a RACH resource from the baseline RACH resources to transmit a random access request 210-a. Random access request 210-a may be transmitted during a peak time and may contribute to network congestion, and base station 105-a may identify the congestion in the network and a possible failure of random access request 210-a resulting therefrom. For example, base station 105-a may perform a correlation on received signal peaks and may determine that random access requests 210 from multiple UEs 115 have collided, or base station 105-a may estimate a number of UEs 115 using the baseline RACH resources (e.g., based on a number of received random access requests 210) and may determine or predict collisions based on the number of UEs 115 (e.g., using an algorithm).

Base station 105-a may respond to random access request 210-a with a random access response, as represented by a second indication 215. The random access response may include a backoff indicator, which may indicate a threshold backoff time that UE 115-a is to wait before performing a retransmission of random access request 210-a. UE 115-a may randomly select a backoff time between zero and the threshold backoff time, and may wait the selected backoff time before performing the retransmission. The backoff performed by UE 115-a may at least partially reduce congestion by delaying the retransmission, but may also impact user experience by introducing additional latency. The random access response (e.g., the second indication 215) may also include an indication of additional RACH resources that UE 115-a may use for retransmission of random access request 210-a or for transmission of one or more other random access requests 210. In some cases, the random access response may also include an indication of resources (e.g., corresponding to the additional RACH resources) to monitor for a random access response (e.g., may indicate one or more additional narrowband IoT carriers).

The UE 115-a may select (e.g., randomly select) a resource from the additional RACH resources and may use the selected resource to retransmit random access request 210-*a* (e.g., as random access request 210-*b*). The UE 115-*a* may perform a full backoff, a modified backoff, or no backoff when transmitting random access request 210-*b*, for example, based on a configuration of UE 115-*a* (e.g., preconfigured at UE 115-*a* or configured via signaling, such as RRC or DCI). In some cases, UE 115-*a* may transmit one or more other random access requests using the additional RACH resources. The additional RACH resources may be temporarily reconfigured (e.g., for a period of time), for example, from uplink channel resources (e.g., physical uplink shared channel (PUSCH) resources) and may reduce a probability of collisions and network congestion due to the larger amount of available RACH resources.

In a second example (e.g., additionally or alternatively), the network may configure (e.g., preconfigure) additional RACH resources for known or estimated peak times. For example, the network may receive information (e.g., on a periodic basis, such as a weekly basis) from a utility company, bike company, or any other operator, indicating peak times for that operator. Additionally or alternatively, the network may estimate peak times based on past network activity. In one example, base station 105-*a* may indicate baseline RACH resources and the additional RACH resources via a same system information (e.g., a same SIB), and may also indicate, via the system information, a time duration or a time period that applies to the additional RACH resources. The time period may include multiple time periods that apply to the additional RACH resources and may be indicated by a beginning and an end time, or a beginning time and a time duration. The time period may be indicated using frame numbers (e.g., one or more hyper frame numbers (HFNs) and/or system frame numbers (SFNs)) or may be indicated using universal or local times.

For example, base station 105-*a* may indicate the baseline RACH resources via a first indication 205 and may indicate the additional RACH resources via a second indication 215, which may both be included in the system information. The system information (e.g., the second indication 215) may also include an indication of the time period (e.g., or multiple time periods) associated with the additional RACH resources. UE 115-*a* may receive the system information and determine to use the additional RACH resources to transmit random access request 210-*a* during a time that is included in the indicated time period. The additional RACH resources may reduce a probability of collisions and network congestion due to the larger amount of available RACH resources.

In some cases, base station 105-*a* may indicate the baseline RACH resources via system information (e.g., a first SIB) and may indicate the additional RACH resources via a different or additional system information (e.g., a second SIB). The second system information may be configured differently from the first system information, such that the first system information may not be changed by information included in the second system information. The second system information may include less information than the first system information (e.g., may be an abbreviated SIB or may not include an entire SIB), such that UE 115-*a* may use less power and incur less latency when acquiring the second system information. The second system information may be acquired by UE 115-*a* within a time window (e.g., X seconds) before performing a random access procedure (e.g., before transmitting a random access request 210). Base station 105-*a* may include an indication in a master information block (MIB) of whether or not the second system information is active, and UE 115-*a* may acquire the second system information based on the indication in the MIB. The indication in the MIB may be, for example, similar to access class barring (ACB), which may prevent some types of network access (e.g., data access) based on network congestion or activity.

In this example, base station 105-*a* may indicate the baseline RACH resources via a first indication 205 (e.g., a first SIB) and may indicate the additional RACH resources via a second indication 215 (e.g., a second SIB). The UE 115-*a* may receive the first system information and may acquire the second system information (e.g., indicating the additional RACH resources and, in some cases, a time period in which they apply) within a time window before transmitting random access request 210-*a*. The UE 115-*a* may transmit random access request 210-*a* using the additional RACH resources (e.g., based on a network congestion or a time period for the additional RACH resources). The additional RACH resources may reduce a probability of collisions and network congestion due to the larger amount of available RACH resources.

Figure 3A:
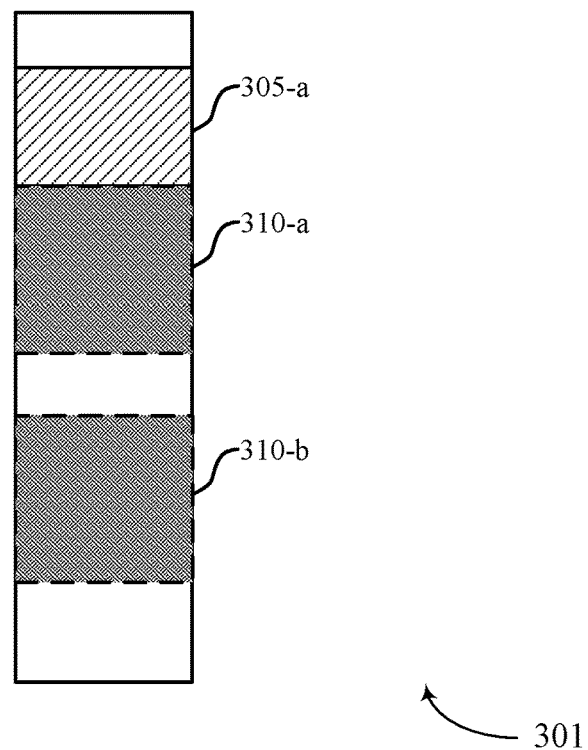
FIGS. 3A and 3B illustrate examples of resource allocation schemes that support random access resources based on network conditions in accordance with aspects of the present disclosure.
Figure 3B:
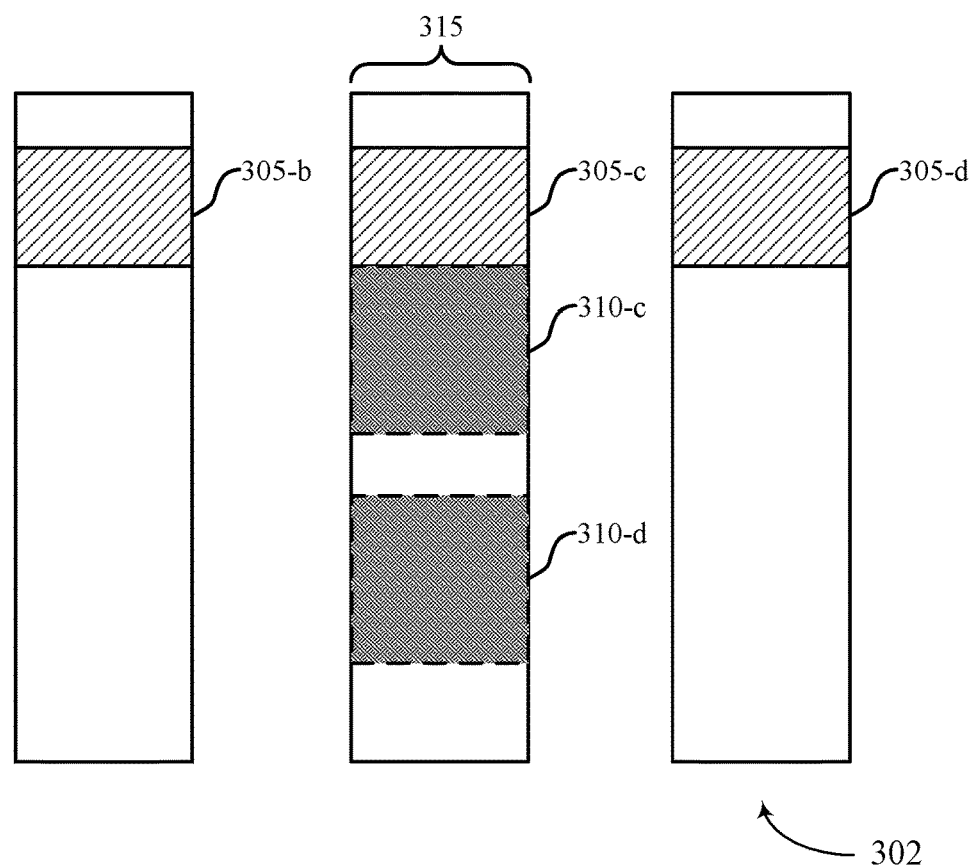

FIGS. 3A and 3B illustrate respective examples of resource allocation schemes 301 and 302 that support random access resources based on network conditions in accordance with aspects of the present disclosure. In some examples, resource allocation schemes 301 and 302 may implement or be implemented by aspects of wireless communications system 100 or 200. For example, a base station 105 may indicate aspects of resource allocation scheme 301 or 302 to a UE 115, such as to configure the UE 115 with additional RACH resources, as described with reference to FIG. 2. The base station 105 and the UE 115 may represent examples of a base station 105 and a UE 115 described with reference to FIGS. 1 and 2.

As described with reference to FIG. 2, the base station 105 may configure the UE 115 with baseline RACH resources 305 (e.g., via system information) and may configure the UE 115 with additional RACH resources 310 for peak times with higher congestion (e.g., via system information or via a random access response). In a first example illustrated by FIG. 3A, the base station 105 may configure the UE 115 with additional RACH resources 310 (e.g., temporarily) after a failed random access request and via a random access response or other message. In a second example illustrated by FIG. 3B, the base station 105 may configure the UE 115 with additional RACH resources 310 and a time period 315 associated with the additional RACH resources 310, for example, via system information (e.g., via same or different system information as associated with the baseline RACH resources 305).

In some cases, the additional RACH resources 310 may include the baseline RACH resources 305. For example, the additional RACH resources 310 may include resources 305-*a* and one or more of resources 310-*a* and 310-*b*, or may include resources 305-*c* and one or more of resources 310-*c* and 310-*d*. In some cases, the additional RACH resources 310 may exclude or omit the baseline RACH resources 305 (e.g., may not overlap with the baseline RACH resources 305). The additional RACH resources 310 may also be configurable by the base station 105, and as such, may overlap or not overlap with the baseline RACH resources 305 based on the configuration determined by the base station 105. If the additional RACH resources 310 include some baseline RACH resources 305, the UE 115 may select from resources including the additional RACH resources 310 and the baseline RACH resources 305 when selecting a resource for a random access request or a retransmission thereof.

In the example illustrated by FIG. 3A, the random access response may indicate the additional RACH resources 310 that the UE 115 may use to retransmit a random access request (or transmit a new random access request, as the case may be) in response to a failed random access request (e.g., due to network congestion). In some cases, the random access response may include an explicit indication (e.g., including one or two bytes of information) that explicitly indicates time and frequency resources or frequency carriers (e.g., non-anchor carriers, such as narrowband IoT carriers) for the additional RACH resources 310. In some cases, the random access response may include an index or another indication of configured additional RACH resources 310. For example, the system information that configures the baseline RACH resources 305 may include an indication of one or more sets of additional RACH resources 310 and the random access response may indicate one of the one or more sets. In some cases, such an indication of the additional RACH resources 310 may include a dedicated field (e.g., may be a direct indication) or may use reserved bits. In some cases, the indication may include an indirect indication that is based on one or more other fields of the random access response (e.g., based on a backoff indicator field). The additional RACH resources 310 may be different for different coverage levels, different beams, or different frequency carriers, among other examples.

If the indication is a direct indication based on a dedicated field or reserved bits of the random access response, the UE 115 may determine a backoff indicator or a backoff time based on a different backoff indicator field of the random access response. In some cases, the UE 115 may ignore the backoff indicator and may retransmit the random access request without waiting. If another UE 115 is not configured to identify the additional RACH resources 310, the other UE 115 may ignore the dedicated field or reserved bits and may perform the backoff based on the backoff indicator. In some cases, the UE 115 may perform a backoff based on the backoff indicator in a same manner as for the baseline RACH resources 305 (e.g., randomly selecting a backoff time between zero and a backoff time threshold). In some cases, the UE 115 may apply the backoff indicator based on whether a resource selected for retransmitting the random access request is within the resources 305 or the resources 310 (e.g., if the additional RACH resources include both resources 305 and 310).

For example, if the UE 115 selects a resource from resources 305, the UE 115 may perform a backoff based on the backoff indicator in the same manner as for the baseline RACH resources 305 and if the UE 115 selects a resource from resources 310, the UE 115 may ignore the backoff indicator and retransmit the random access request without waiting. In some cases, the UE 115 may scale the backoff indicator by a factor (e.g., multiply the backoff indicator by a factor, such as represented by β) when using the additional RACH resources 310. The scaling factor may be indicated in a configuration for the additional RACH resources 310.

If the indication is an indirect indication based on one or more other fields of the random access response (e.g., a backoff indicator field or the indication of the additional RACH resources is multiplexed with one or more other indicators), the UE 115 may determine a backoff indicator or a backoff time based on the backoff indicator field of the random access response. In some cases, if the backoff indicator field is used to indicate the additional RACH resources 310, the UE 115 may interpret the backoff indicator field as an indication of the additional RACH resources 310 and may not determine a backoff based on the backoff indicator field (e.g., may retransmit the random access request without a backoff time). If another UE 115 is not configured to identify the additional RACH resources 310, the other UE 115 may perform the backoff based on the backoff indicator.

In some cases, the UE 115 may interpret the backoff indicator field as an indication of the backoff indicator and the additional RACH resources 310. For example, each possible value of the backoff indicator field may be mapped to a set of additional RACH resources 310 and a backoff threshold, for example, via a mapping signaled to the UE 115 (e.g., via a SIB) or preconfigured for the UE 115 and the base station 105. In one example, a backoff indicator value of '2' may represent a mapped pair of a backoff threshold (e.g., 256 ms) and a set of additional RACH resources 310 (e.g., 'resource set 2'). Such a backoff indicator value may represent a different backoff threshold value for a UE 115 that is not configured to identify additional RACH resources 310 (e.g., and such a UE 115 may not identify the other backoff threshold or the additional RACH resources 310 based on the backoff indicator).

The additional RACH resources 310 signaled by the random access response may be available for a period of time or a number of retransmissions, and the base station 105 and the UE 115 may determine the period of time or number of retransmissions based on a configuration for the additional RACH resources 310 (e.g., as preconfigured at the devices or as signaled via configuration signaling, such as RRC or DCI). If the UE 115 and the base station 105 are aligned on the period of time or the number of retransmissions, collisions with other traffic may be decreased (e.g., because the additional RACH resources 310 may be repurposed from resources for the other traffic).

In a first example, the additional RACH resources 310 may be available for a number of retransmissions of the random access request (e.g., N retransmissions or reattempts). The UE 115 may initiate a counter (e.g., a tracking parameter) to count the number of retransmissions beginning with a first retransmission. If the UE 115 performs additional retransmissions, the UE 115 may increment the counter for each retransmission until reaching a counter threshold. If the counter reaches or exceeds the counter threshold, the UE 115 may stop using the additional RACH resources 310 and may begin using the baseline RACH resources 305. In some cases, the counter threshold may be one, and the UE 115 may begin using the baseline RACH resources 305 after one retransmission attempt. If the UE 115 receives another indication of additional RACH resources 310 from the base station 105 (e.g., after starting the counter), the UE 115 may restart the counter. The counter threshold may be indicated in the random access response, via signaling from the base station 105 (e.g., via a SIB), or may be preconfigured for the UE 115 and the base station 105.

In a second example, the additional RACH resources 310 may be available for a time period after the random access request, for example, based on a timer. The UE 115 may initiate a timer (e.g., a tracking parameter) at an end of a TTI (e.g., a subframe) in which the UE 115 receives the random access response. If the timer reaches or exceeds a timer threshold, the UE 115 may stop using the additional RACH resources 310 and may begin using the baseline RACH resources 305. If the UE 115 receives another indication of additional RACH resources 310 from the base station 105 (e.g., after starting the timer), the UE 115 may restart the timer. The timer threshold may be indicated in the random access response, via signaling from the base station 105 (e.g., via a SIB), or may be preconfigured for the UE 115 and the base station 105.

The additional RACH resources 310 signaled by the random access response may be associated with one or more power ramping or coverage enhancement procedures, which may, in some cases, be different than procedures used for the baseline RACH resources 305. Power ramping for the baseline RACH resources 305 may be performed, for example, using an equation such as equation (1):

$$\text{MSG3\_RECEIVED\_TARGET\_POWER} = \text{preambleInitialReceivedTargetPower} + (\text{PREAMBLE\_TRANSMISSION\_COUNTER\_CE} - 1) \cdot \text{powerRampingStep} \quad (1)$$

where MSG3_RECEIVED_TARGET_POWER represents a power for retransmission of a random access request, preambleInitialReceivedTargetPower represents an initial power used to transmit a first random access request, PREAMBLE_TRANSMISSION_COUNTER_CE represents a counter of a number of transmissions of a random access request, and powerRampingStep represents an amount of power to ramp up for each retransmission of the random access request. When using an equation such as equation (1), the UE 115 may increment a value of the counter for each transmission or retransmission of the random access request. A similar method may be used for ramping up a coverage enhancement level (e.g., a number of repetitions) for each transmission or retransmission of a random access request.

In some cases, the UE 115 may not increment a counter for determining power ramping or coverage enhancement after receiving the indication of the additional RACH resources 310. In some cases, the UE 115 may increment the counter in a same manner as for the baseline RACH resources 305 (e.g., may increment the counter after each transmission or retransmission). In some cases, the UE 115 may reset the counter after receiving the indication of the additional RACH resources 310. In some cases, the UE 115 may increase a transmission power or coverage enhancement level for transmission via the additional RACH resources 310 and may not increase the counter. For example, the UE 115 may be configured to maintain different counters for determining the transmission power or coverage enhancement level and for the number of transmission attempts. In some cases, the UE 115 may maintain a same transmission power or coverage enhancement level for transmission via the additional RACH resources 310 and may increment the transmission counter (e.g., based on separate counters for the transmission power or coverage enhancement level and the number of transmission attempts).

Some RACH parameters may be different for the baseline RACH resources 305 and the additional RACH resources 310, or may be different for different sets of additional RACH resources 310. These RACH parameters may include, but are not limited to, a random access response size, power ramping parameters, a number of random access request attempts, a number of msg3 retransmissions, random access preambles (e.g., or groups thereof), a random access response window, a number of preamble transmissions, an initial preamble power, a preamble format, a contention resolution timer, enhanced coverage levels, a reference signal received power (RSRP) threshold, reference signal candidate beams, a search space identity, a prioritized scaling factor, available resources, or a preamble starting index, among other examples.

In some cases, usage of the additional RACH resources 310 may be based on a UE category, type, capability, access class, traffic type, or any combination thereof, among other examples. For example, some types, classes, or categories of UEs 115 may be configured to support additional RACH resources 310 and some types, classes, or categories of UEs 115 may not be configured to support additional RACH resources 310. As such, some UEs 115 (e.g., not configured to support the additional RACH resources 310) may receive the indication of the additional RACH resources 310 and may continue to use the baseline RACH resources 305.

In some cases, a random access radio network temporary identifier (RA-RNTI) associated with a random access response that is in response to a random access request transmitted via the additional RACH resources 310 may be different or modified from an RA-RNTI associated with a random access response that is in response to a random access request transmitted via the baseline RACH resources 305. For example, some reserved bits of the random access response may indicate whether the RA-RNTI is associated with the additional RACH resources 310 or the baseline RACH resources 305. In some cases, a random access preamble identifier (RAPID) associated with a random access response may be based on whether the associated random access request is transmitted via the additional RACH resources 310 or via the baseline RACH resources 305. In some case, the RA-RNTI or the RAPID may be based on whether the additional RACH resources 310 and the baseline RACH resources 305 overlap (e.g., in same time and/or frequency resources). For example, the RA-RNTI or the RAPID may not be different for the additional RACH resources 310 if the additional RACH resources 310 include the baseline RACH resources 305 (e.g., or at least a portion thereof).

In the example illustrated by FIG. 3B, system information may indicate the additional RACH resources 310 (e.g., and an associated time period 315). Accordingly, RACH resources outside of the time period 315 may be represented by the baseline RACH resources 305 (e.g., baseline RACH resources 305-*b* and 305-*d*), and RACH resources within the time period 315 may be represented by the additional RACH resources 310 (e.g., including one or more of additional RACH resources 310-*c* and 310-*d*, and in some cases, resources 305-*c*).

In accordance with the examples described herein, the UE 115 may select a resource from the additional RACH resources 310 in order to transmit a retransmission or additional random access request (e.g., in resource allocation scheme 301) or to transmit an initial random access request (e.g., in resource allocation scheme 302). The UE 115 may transmit the random access request to the base station 105, and a likelihood of reception of the random access request may be increased by the additional RACH resources 310.

Figure 4:
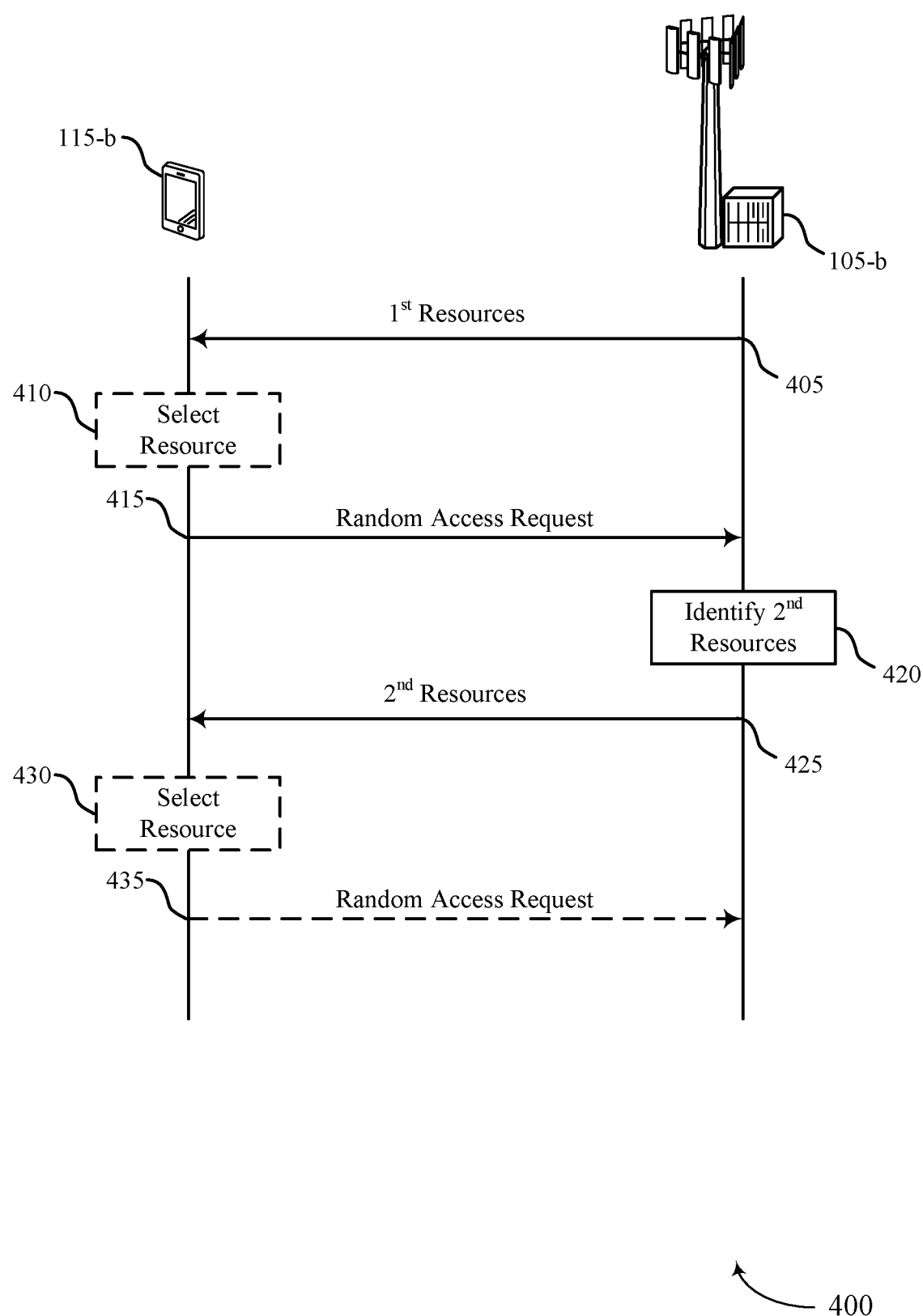
FIG. 4 illustrates an example of a process flow that supports random access resources based on network conditions in accordance with aspects of the present disclosure.

FIG. 4 illustrates an example of a process flow 400 that supports random access resources based on network conditions in accordance with aspects of the present disclosure. In some examples, process flow 400 may implement or be implemented by aspects of wireless communications system 100 or 200. For example, process flow 400 may be implemented by a UE 115-*b* and a base station 105-*b*, which may be examples of a UE 115 and a base station 105 described with reference to FIGS. 1-3. Base station 105-*b* may indicate aspects of additional RACH resources to UE 115-*b*, as described with reference to FIGS. 2 and 3, and UE 115-*b* may use the additional RACH resources to improve communication quality when transmitting a random access request.

In the following description of process flow 400, the operations between base station 105-*b* and UE 115-*b* may be transmitted in a different order than the order shown, or the operations performed by base station 105-*b* and UE 115-*b* may be performed in different orders or at different times. For example, an indication of a second set of resources (e.g., additional RACH resources) may be transmitted at different times. Specific operations may also be left out of process flow 400, or other operations may be added to process flow 400. Although base station 105-*b* and UE 115-*b* are shown performing the operations of process flow 400, some aspects of some operations may also be performed by one or more other wireless devices.

At 405, base station 105-*b* may transmit, to UE 115-*b* and via a system information message, a first indication of a first set of resources for a RACH (e.g., baseline RACH resources). The first set of resources may be configured as baseline RACH resources for random access requests outside of peak network times.

At 410, in some cases, UE 115-*b* may select a resource (e.g., a first resource) for a random access request. For example, UE 115-*b* may randomly select the resource for transmitting the random access request (e.g., from the first set of resources or from a second set of resources).

At 415, UE 115-*b* may transmit, to base station 105-*b*, a random access request via the selected resource.

At 420, base station 105-*b* may identify a second set of resources for the RACH (e.g., additional RACH resources). In some cases, base station 105-*b* may identify the second set of resources based on receiving the random access request from UE 115-*b*. In some cases, base station 105-*b* may identify the second set of resources based on a network congestion or collisions. In some cases, base station 105-*b* may identify the second set of resources based on a network configuration for peak times, where the second set of resources may be configured for one or more peak times and not for other time periods.

At 425, base station 105-*b* may transmit, to UE 115-*b*, a second indication of the second set of resources. Base station 105-*b* may, for example, transmit the second indication via a random access response or another message (e.g., in response to the random access request). In some cases, base station 105-*b* may transmit the second indication as part of system information (e.g., a SIB, for example, using same system information or different system information from the system information including the first indication. In some cases, base station 105-*b* may transmit the second indication before UE 115-*b* selects the resource and transmits the random access request, such that UE 115-*b* may use or consider the second set of resources for transmission of the random access request.

At 430, if the second indication is received in response to the random access request, UE 115-*b* may select a second resource for transmitting a second random access request (e.g., a retransmission of the random access request). For example, UE 115-*b* may select the second resource from the second set of resources (e.g., which may include at least a portion of the first set of resources).

At 435, if UE 115-*b* has selected the second resource, UE 115-*b* may transmit, to base station 105-*b*, the second random access request via the second resource.

In accordance with the examples described herein, the UE 115-*b* may select a resource from the second set of resources in order to transmit or retransmit a random access request or to transmit an initial random access request. The UE 115-*b* may transmit the random access request to base station 105-*b*, and a likelihood of reception of the random access request may be increased by second set of resources.

Figure 5:
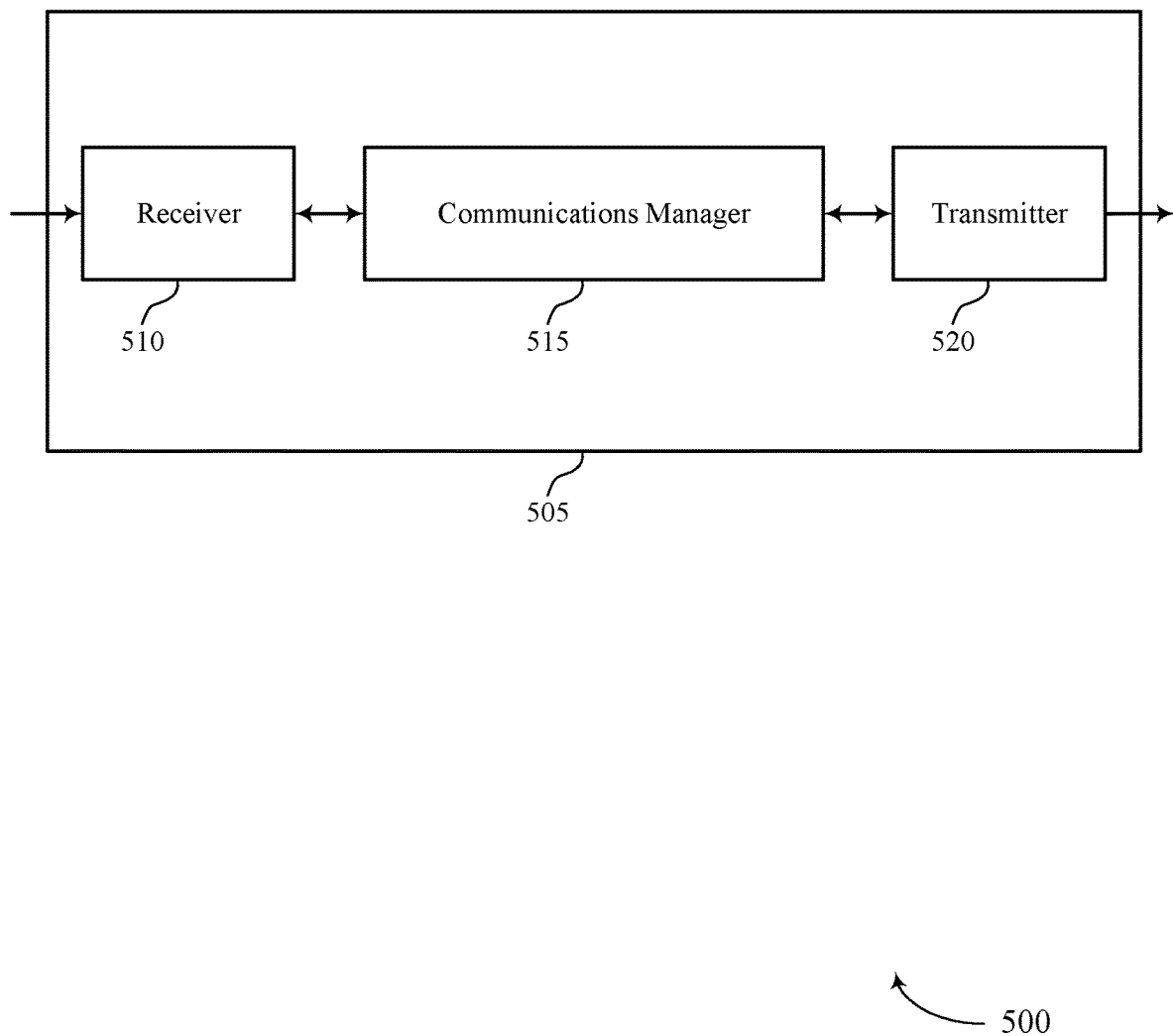
FIGS. 5 and 6 show block diagrams of devices that random access resources based on network conditions in accordance with aspects of the present disclosure.

FIG. 5 shows a block diagram 500 of a device 505 that supports random access resources based on network conditions in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to random access resources based on network conditions, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, from a base station and via a system information message, a first indication of a first set of resources for a RACH, transmit a random access request via a first resource of the first set of resources based on the first indication, receive, from the base station and in response to transmitting the random access request, a second indication of a second set of resources for the RACH different than the first set of resources, and transmit a second random access request via a second resource of the second set of resources.

The communications manager 515 may also receive, from a base station and via a system information message, a first indication of a first set of resources configured for a first time duration for a RACH, receive, from the base station, a second indication of a second set of resources configured for a second time duration for the RACH, the second time duration different from the first time duration and the second set of resources different than the first set of resources, determine whether to transmit a random access request via a first resource of the first set of resources or via a second resource of the second set of resources based on being within the first time duration or the second time duration, and transmit the random access request based on the determining. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

The actions performed by the communications manager 515, among other examples herein, may be implemented to realize one or more potential advantages. For example, communications manager 515 may increase communication quality and reduce latency at a wireless device (e.g., a UE 115) by identifying additional RACH resources for transmitting a random access request. The increase in communication quality may result in increased link performance, decreased overhead, and decreased latency based on identifying additional RACH resources for transmitting a random access request and transmitting the random access request using the additional RACH resources. Accordingly, communications manager 515 may save power and increase battery life at a wireless device (e.g., a UE 115) by strategically increasing a quality of communications and reducing latency at a wireless device (e.g., a UE 115).

Figure 6:
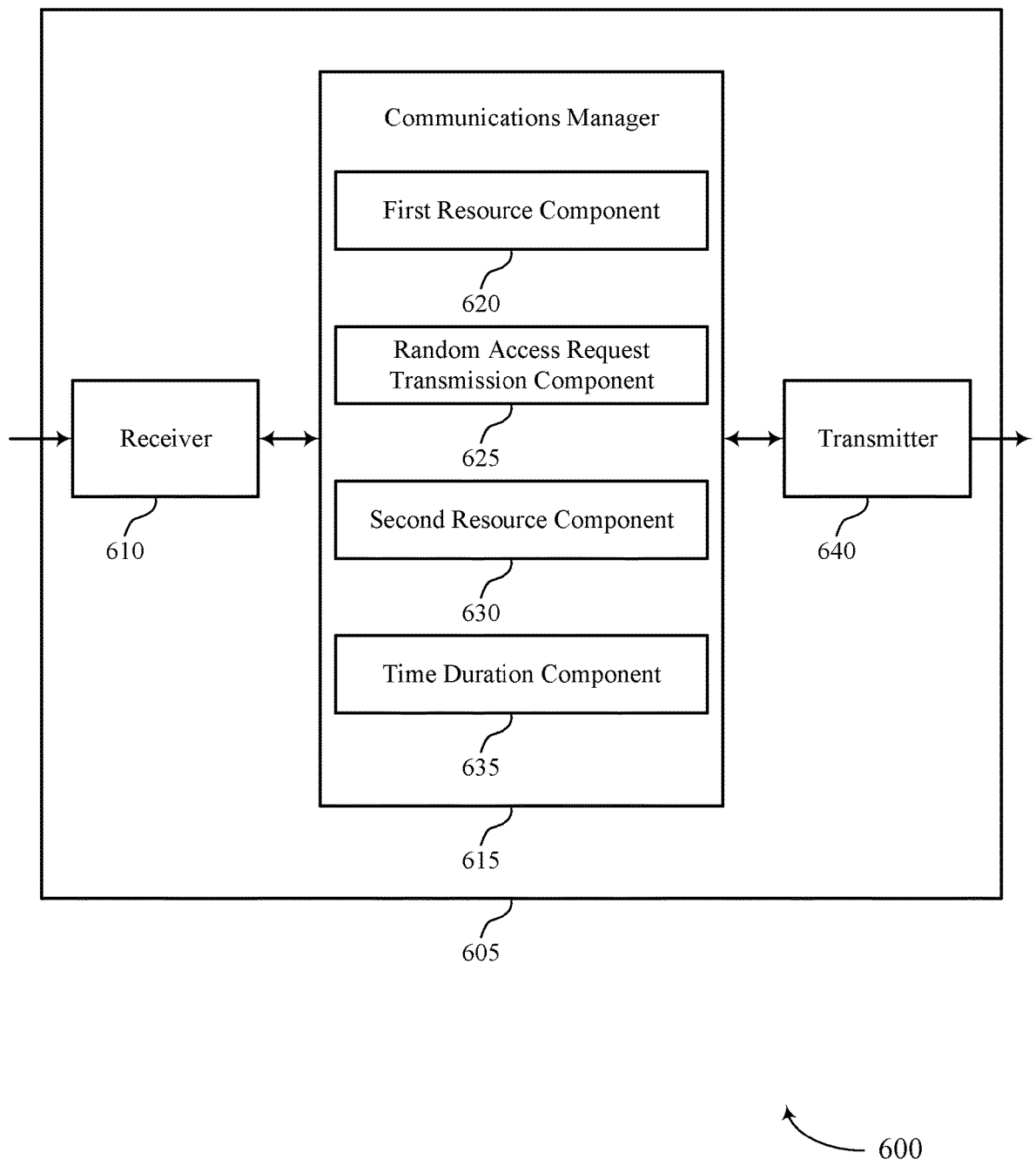

FIG. 6 shows a block diagram 600 of a device 605 that supports random access resources based on network conditions in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to random access resources based on network conditions, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a first resource component 620, a random access request transmission component 625, a second resource component 630, and a time duration component 635. The communications manager 615 may be an example of aspects of the communications manager 810 described herein.

The first resource component 620 may receive, from a base station and via a system information message, a first indication of a first set of resources for a RACH. The random access request transmission component 625 may transmit a random access request via a first resource of the first set of resources based on the first indication. The second resource component 630 may receive, from the base station and in response to transmitting the random access request, a second indication of a second set of resources for the RACH different than the first set of resources. The random access request transmission component 625 may transmit a second random access request via a second resource of the second set of resources.

The first resource component 620 may receive, from a base station and via a system information message, a first indication of a first set of resources configured for a first time duration for a RACH. The second resource component 630 may receive, from the base station, a second indication of a second set of resources configured for a second time duration for the RACH, the second time duration different from the first time duration and the second set of resources different than the first set of resources. The time duration component 635 may determine whether to transmit a random access request via a first resource of the first set of resources or via a second resource of the second set of resources based on being within the first time duration or the second time duration. The random access request transmission component 625 may transmit the random access request based on the determining.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

A processor of a wireless device (e.g., controlling the receiver 610, the transmitter 640, or the transceiver 820 as described with reference to FIG. 8) may increase communication reliability and quality, as well as decrease latency. The increased communication quality may reduce power consumption (e.g., via implementation of system components described with reference to FIG. 7) compared to other systems and techniques, for example, that do not support identifying additional RACH resources for transmitting a random access request, which may decrease communication quality and increase power consumption. Further, the processor of the UE 115 may identify one or more aspects of a configuration for additional RACH resources. The processor of the wireless device may use the configuration to perform one or more actions that may result in increased communication quality and power consumption, as well as save power and increase battery life at the wireless device (e.g., by strategically supporting transmission of random access requests via the additional RACH resources, which may increase communication quality), among other benefits.

Figure 7:
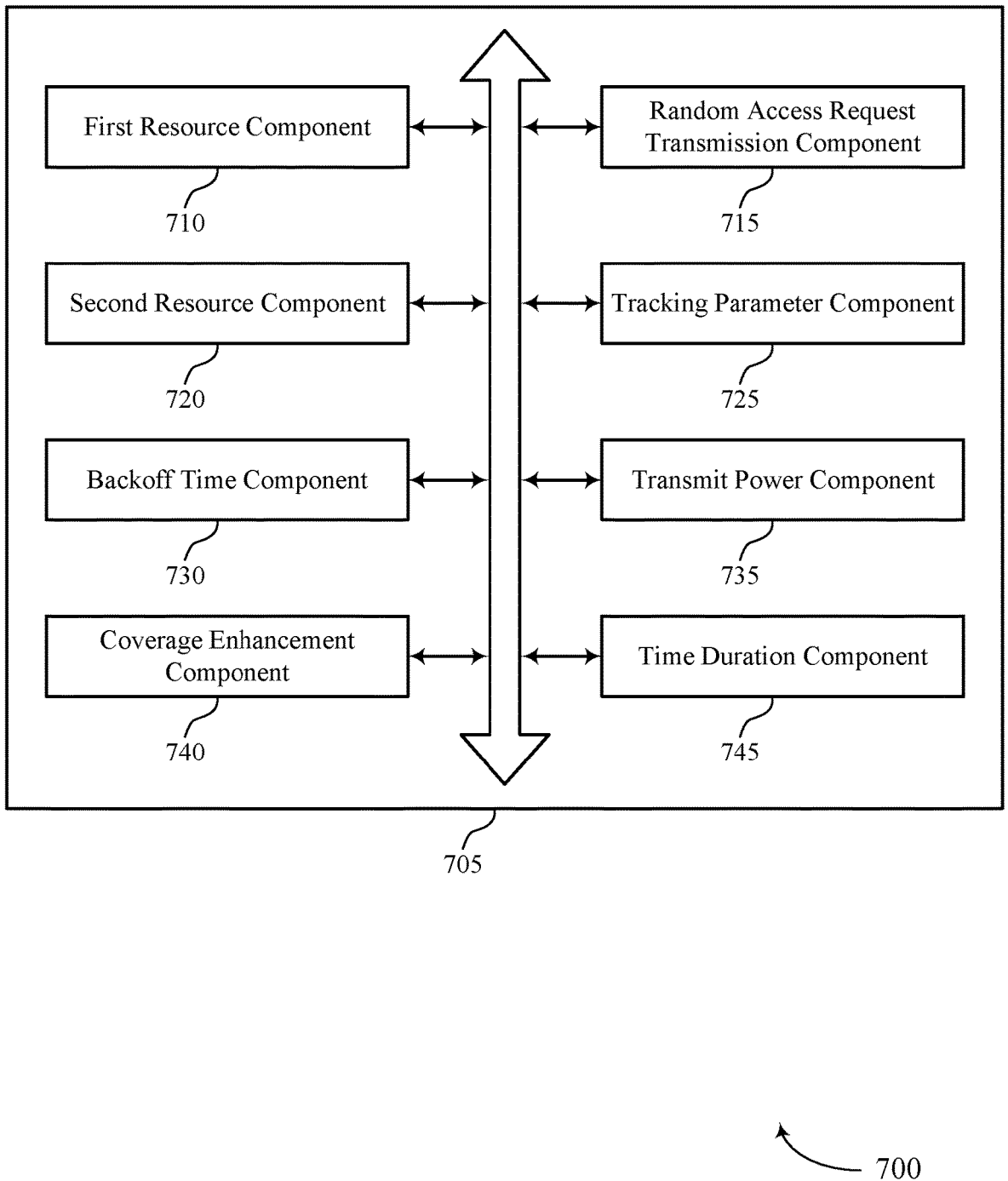
FIG. 7 shows a block diagram of a communications manager that supports random access resources based on network conditions in accordance with aspects of the present disclosure.

FIG. 7 shows a block diagram 700 of a communications manager 705 that supports random access resources based on network conditions in accordance with aspects of the present disclosure. The communications manager 705 may be an example of aspects of a communications manager 515, a communications manager 615, or a communications manager 810 described herein. The communications manager 705 may include a first resource component 710, a random access request transmission component 715, a second resource component 720, a tracking parameter component 725, a backoff time component 730, a transmit power component 735, a coverage enhancement component 740, and a time duration component 745. Each of these modules may communicate, directly or indirectly, with one another (e.g., via one or more buses).

The first resource component 710 may receive, from a base station and via a system information message, a first indication of a first set of resources for a RACH. In some examples, the first resource component 710 may receive, from a base station and via a system information message, a first indication of a first set of resources configured for a first time duration for a RACH. In some cases, the first set of resources include a default set of resources for the RACH.

The random access request transmission component 715 may transmit a random access request via a first resource of the first set of resources based on the first indication. In some examples, the random access request transmission component 715 may transmit a second random access request via a second resource of a second set of resources. In some examples, the random access request transmission component 715 may transmit the random access request based on determining whether to transmit a random access request via a first resource of the first set of resources or via a second resource of the second set of resources. In some examples, the random access request transmission component 715 may transmit the second random access request via the second resource of the second set of resources based on a type of the UE, a capability of the UE, an access class of the UE, a traffic type of communications at the UE, or any combination thereof.

The second resource component 720 may receive, from the base station and in response to transmitting the random access request, a second indication of a second set of resources for the RACH different than the first set of resources. In some examples, the second resource component 720 may receive, from the base station, a second indication of a second set of resources configured for a second time duration for the RACH, the second time duration different from the first time duration and the second set of resources different than the first set of resources. In some examples, the second resource component 720 may receive, via the system information message, an indication of one or more sets of resources for the RACH, the one or more sets of resources different than the first set of resources and including the second set of resources.

In some examples, the second resource component 720 may receive, via the second indication, an indication of at least one set of the one or more sets of resources, the at least one set of resources including the second set of resources. In some cases, the indication of the at least one set of resources includes a field dedicated to indicating the at least one set of resources. In some cases, the indication of the at least one set of resources includes a field indicating one or more other parameters for transmitting the second random access request. In some cases, the second indication includes information about time resources and frequency resources, one or more frequency carriers, or any combination thereof of the second set of resources. In some cases, a field that includes the second indication of the second set of resources further includes a backoff indicator that indicates a backoff time associated with retransmissions of the random access request using the first set of resources. In some cases, the backoff time may increase a likelihood of reception of the random access request at a base station, for example, based on transmitting the random access request at a time with less network congestion.

In some cases, a first field of a message includes the second indication of the second set of resources. In some cases, the second indication includes a random access response, a control message, configuration signaling, or any combination thereof.

In some examples, the second resource component 720 may determine a modified RA-RNTI associated with a random access response to the second random access request based on transmitting the second random access request via the second set of resources. In some cases, a RAPID for a random access response is based on whether an associated random access request is transmitted via the first set of resources or the second set of resources. In some examples, the second resource component 720 may monitor for a second system information message within a time window before transmitting the random access request, where receiving the second indication of the second set of resources is based on monitoring for the second system information message. In some examples, the second resource component 720 may receive a MIB indicating whether the second system information message is active, where receiving the second indication is based on whether the second system information message is active. In some cases, the indication of the second set of resources includes a portion of the system information message. In some cases, the indication of the second set of resources includes a second system information message.

In some cases, the second set of resources is based on a congestion associated with a network. The second set of resources may be configured, for example, to reduce the congestion based on an increased amount of resources (e.g., the first and second sets of resources) available for transmission of a random access request. In some cases, the second set of resources is based on one or more coverage levels, one or more communication beams, one or more frequency carriers, or any combination thereof, associated with the second set of resources. In some cases, the second time duration for using the second set of resources is within the first time duration associated with the default set of resources.

The time duration component 745 may determine whether to transmit a random access request via a first resource of the first set of resources or via a second resource of the second set of resources based on being within the first time duration or the second time duration. For example, the time duration component 745 may determine to transmit the random access request using the second set of resources based on being within the second time duration, which may reduce network congestion and increase a likelihood of reception of the random access request. In some cases, the first time duration and the second time duration each include one or more frame numbers.

The tracking parameter component 725 may use a tracking parameter to determine when to cease random access request transmissions using the second set of resources based on receiving the second indication, where transmitting the second random access request is based on initiating the tracking parameter. In some examples, the tracking parameter component 725 may determine that the tracking parameter satisfies a threshold based on initiating the tracking parameter. In some examples, the tracking parameter component 725 may transmit a third random access request via a third resource of the first set of resources based on the tracking parameter satisfying the threshold. In some examples, the tracking parameter component 725 may receive the threshold via the second indication, the system information message, or any combination thereof, where determining that the tracking parameter is satisfied is based on receiving the threshold.

In some examples, the tracking parameter component 725 may receive, from the base station and based on transmitting the second random access request, a third indication of a third set of resources for the RACH different than the first set of resources. In some examples, the tracking parameter component 725 may restart the tracking parameter based on receiving the third indication.

In some examples, the tracking parameter component 725 may modify a value of the tracking parameter based on transmitting the second random access request, where the tracking parameter includes a counter that represents a quantity of retransmissions of the random access request. In some cases, the tracking parameter includes a timer that represents a quantity of time that the second set of resources is available for random access request transmissions via the second set of resources.

The backoff time component 730 may identify a first backoff time associated with the first set of resources based on receiving the second indication. In some examples, the backoff time component 730 may adjust the first backoff time to a second backoff time for the second set of resources using a scaling factor, where transmitting the second random access request in based on the second backoff time. In some examples, the backoff time component 730 may select a resource included in the first set of resources and the second set of resources for transmission of the second random access request. In some examples, the backoff time component 730 may set the second backoff time to the first backoff time based on the resource being included in the first set of resources and the second set of resources.

In some examples, the backoff time component 730 may identify a backoff time for the second set of resources based on a field of the second indication, the field including an indication of the second set of resources and the backoff time, where transmitting the second random access request in based on the backoff time. In some examples, the backoff time component 730 may identify a backoff time associated with the first set of resources based on receiving the second indication. In some examples, the backoff time component 730 may refrain from using the backoff time for the second set of resources based on receiving the second indication of the second set of resources, where transmitting the second random access request in based on the refraining. In some cases, a second field of the message includes a backoff indicator that indicates a backoff time associated with retransmissions of the random access request using the first set of resources.

The transmit power component 735 may determine a transmit power for the second random access request based on using the second set of resources, where transmitting the second random access request is based on determining the transmit power. In some examples, the transmit power component 735 may determine a value of a counter for the second random access request based on using the second set of resources, where the counter represents a quantity of random access request transmissions, where transmitting the second random access request is based on determining the value of the counter.

In some examples, the transmit power component 735 may increase the transmit power of the second random access request as compared with a transmit power associated with transmission of the random access request or may use a same transmit power for the second random access request as the transmit power associated with transmission of the random access request. In some examples, the transmit power component 735 may use a same transmit power for the second random access request as the transmit power associated with transmission of the random access request.

In some examples, the transmit power component 735 may increment the value of the counter after transmitting the random access request or maintain the value of the counter after transmitting the random access request. In some examples, the transmit power component 735 may maintain the value of the counter after transmitting the random access request. In some examples, the transmit power component 735 may determine to reset the value of the counter based on receiving the second indication. In some cases, the transmit power for the second random access request is based on the counter for the transmit power.

The coverage enhancement component 740 may determine a coverage enhancement level for the second random access request based on using the second set of resources, where transmitting the second random access request is based on determining the coverage enhancement level.

In some examples, the coverage enhancement component 740 may increase the coverage enhancement level of the second random access request as compared with a coverage enhancement level associated with transmission of the random access request or use a same coverage enhancement level for the second random access request as the coverage enhancement level associated with transmission of the random access request. In some examples, the coverage enhancement component 740 may use a same coverage enhancement level for the second random access request as the coverage enhancement level associated with transmission of the random access request. In some cases, the coverage enhancement level for the second random access request is based on a value of a counter for the coverage enhancement level.

Figure 8:
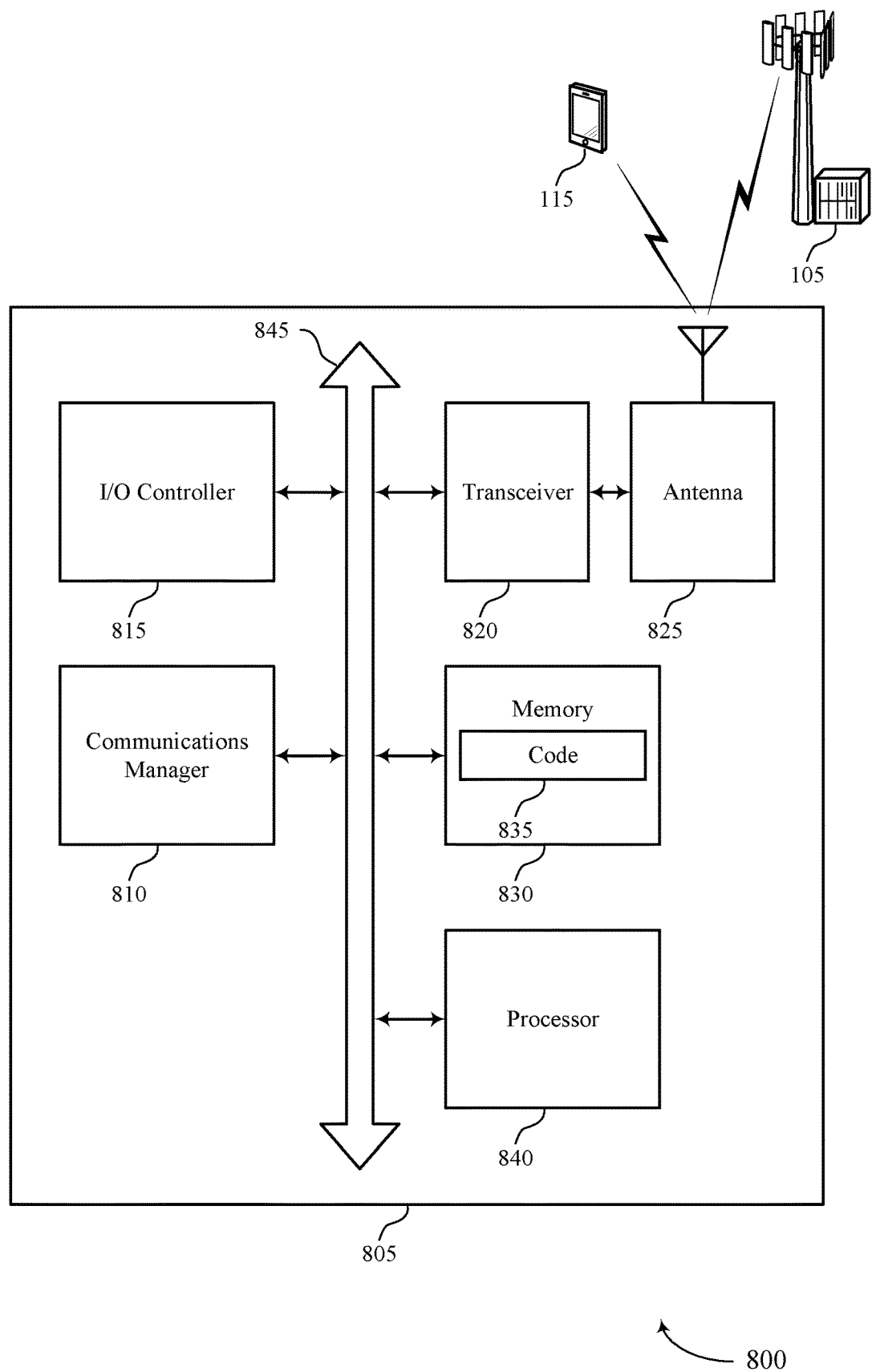
FIG. 8 shows a diagram of a system including a device that supports random access resources based on network conditions in accordance with aspects of the present disclosure.

FIG. 8 shows a diagram of a system 800 including a device 805 that supports random access resources based on network conditions in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, from a base station and via a system information message, a first indication of a first set of resources for a RACH, transmit a random access request via a first resource of the first set of resources based on the first indication, receive, from the base station and in response to transmitting the random access request, a second indication of a second set of resources for the RACH different than the first set of resources, and transmit a second random access request via a second resource of the second set of resources.

The communications manager 810 may also receive, from a base station and via a system information message, a first indication of a first set of resources configured for a first time duration for a RACH, receive, from the base station, a second indication of a second set of resources configured for a second time duration for the RACH, the second time duration different from the first time duration and the second set of resources different than the first set of resources, determine whether to transmit a random access request via a first resource of the first set of resources or via a second resource of the second set of resources based on being within the first time duration or the second time duration, and transmit the random access request based on the determining.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting random access resources based on network conditions).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
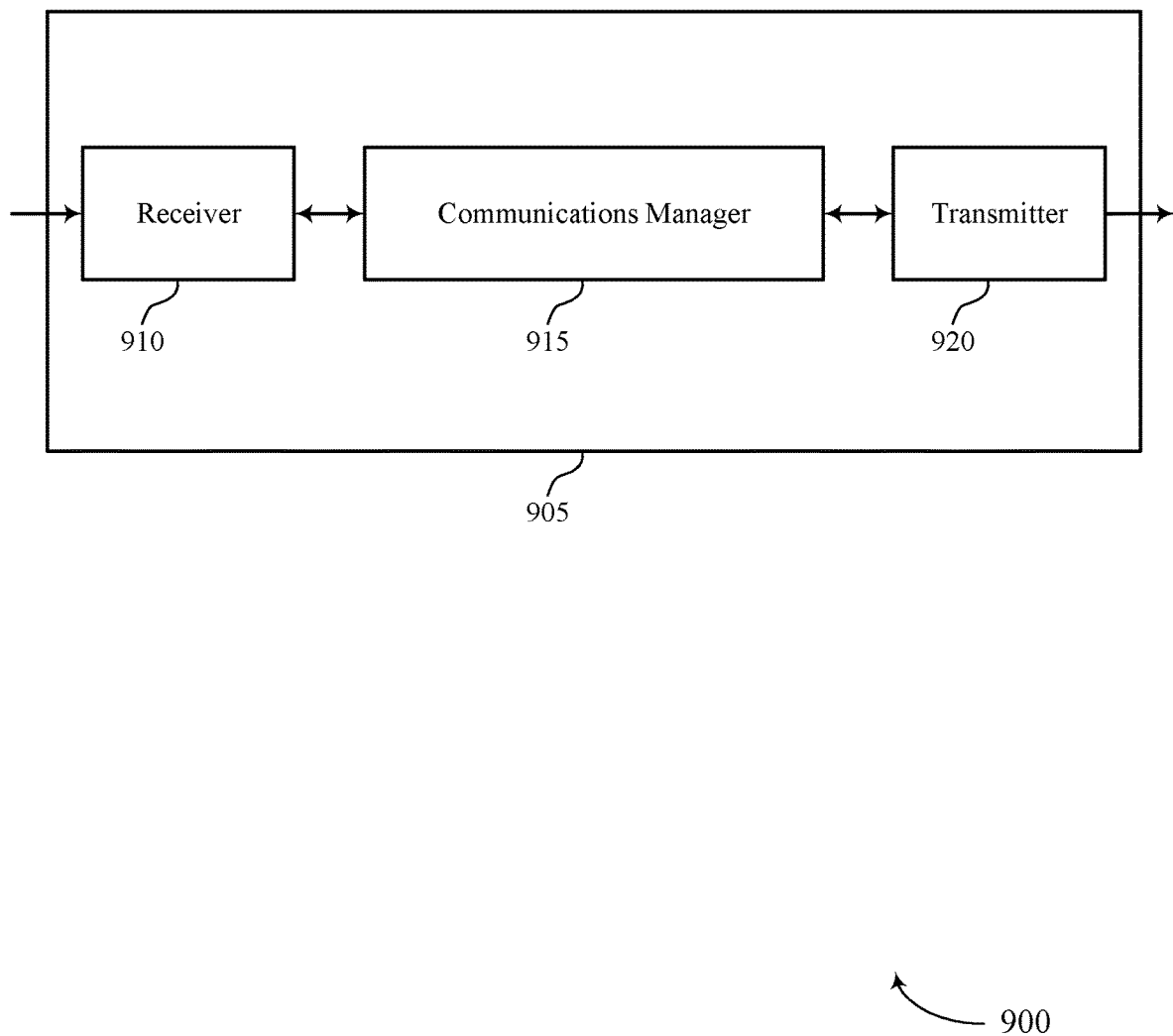
FIGS. 9 and 10 show block diagrams of devices that support random access resources based on network conditions in accordance with aspects of the present disclosure.

FIG. 9 shows a block diagram 900 of a device 905 that supports random access resources based on network conditions in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to random access resources based on network conditions, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, via a system information message, a first indication of a first set of resources for a RACH, receive, from a UE, a random access request via a first resource of the first set of resources, identify a second set of resources for the RACH based on receiving the random access request, transmit, to the UE and in response to receiving the random access request, a second indication of the second set of resources, and receive a second random access request via a second resource of the second set of resources.

The communications manager 915 may also transmit a system information message indicating a first set of resources configured for a first time duration for a RACH, identify a second set of resources configured for a second time duration for the RACH, the second set of resources different than the first set of resources and the second time duration different than the first time duration, transmit an indication of the second set of resources, and receive, from a UE, a random access request via a resource selected from the first set of resources or the second set of resources based on being within the first time duration or the second time duration. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
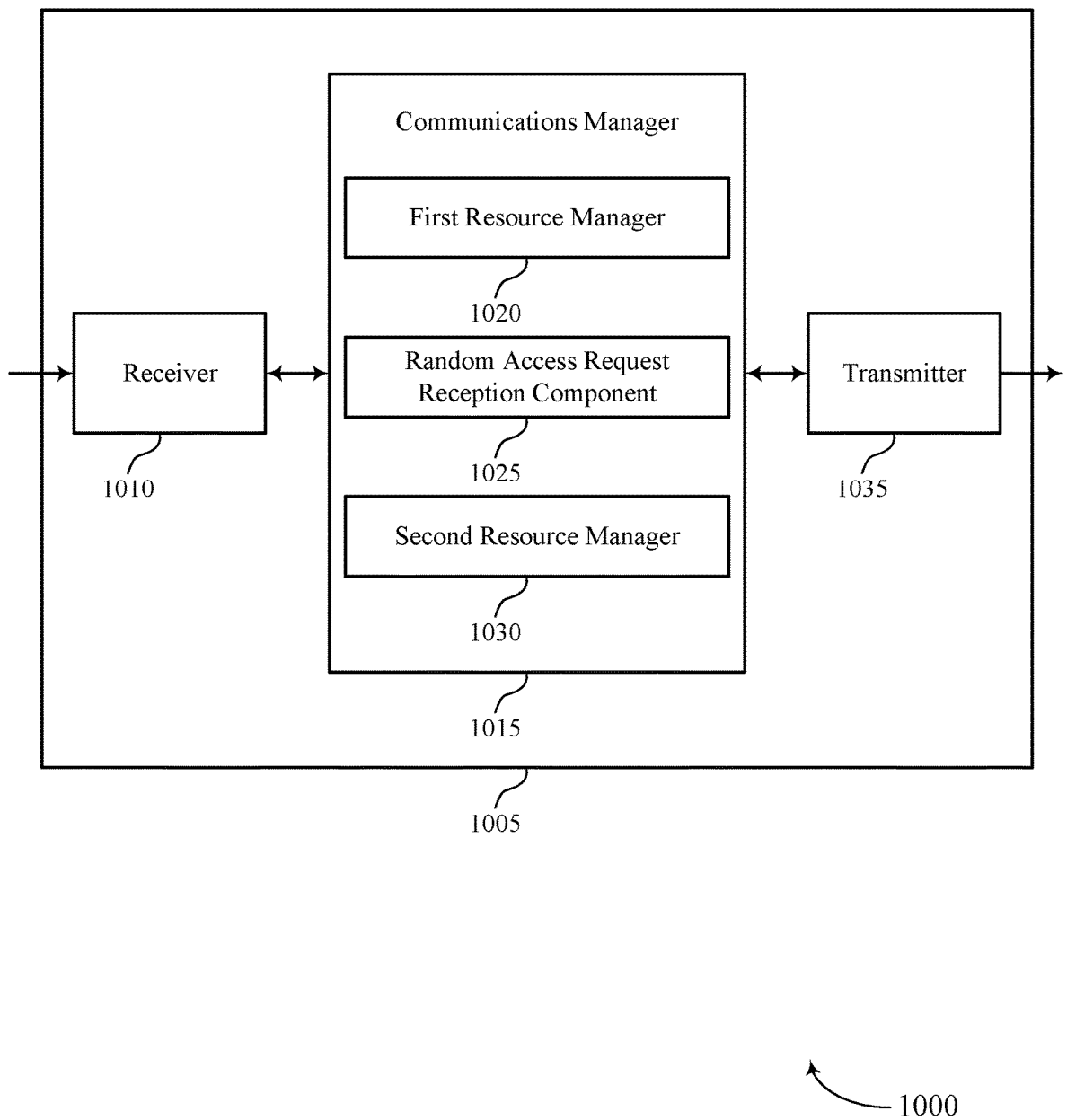

FIG. 10 shows a block diagram 1000 of a device 1005 that supports random access resources based on network conditions in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to random access resources based on network conditions, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a first resource manager 1020, a random access request reception component 1025, and a second resource manager 1030. The communications manager 1015 may be an example of aspects of the communications manager 1210 described herein.

The first resource manager 1020 may transmit, via a system information message, a first indication of a first set of resources for a RACH. The random access request reception component 1025 may receive, from a UE, a random access request via a first resource of the first set of resources. The second resource manager 1030 may identify a second set of resources for the RACH based on receiving the random access request and transmit, to the UE and in response to receiving the random access request, a second indication of the second set of resources. The random access request reception component 1025 may receive a second random access request via a second resource of the second set of resources.

The first resource manager 1020 may transmit a system information message indicating a first set of resources configured for a first time duration for a RACH. The second resource manager 1030 may identify a second set of resources configured for a second time duration for the RACH, the second set of resources different than the first set of resources and the second time duration different than the first time duration and transmit an indication of the second set of resources. The random access request reception component 1025 may receive, from a UE, a random access request via a resource selected from the first set of resources or the second set of resources based on being within the first time duration or the second time duration.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
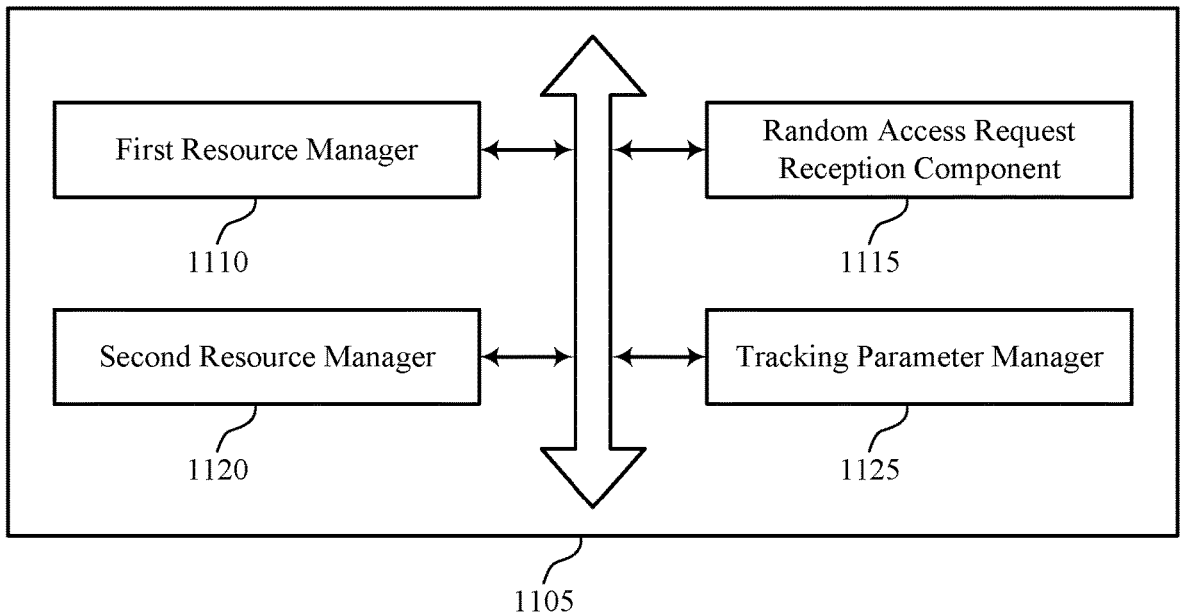
FIG. 11 shows a block diagram of a communications manager that supports random access resources based on network conditions in accordance with aspects of the present disclosure.

FIG. 11 shows a block diagram 1100 of a communications manager 1105 that supports random access resources based on network conditions in accordance with aspects of the present disclosure. The communications manager 1105 may be an example of aspects of a communications manager 915, a communications manager 1015, or a communications manager 1210 described herein. The communications manager 1105 may include a first resource manager 1110, a random access request reception component 1115, a second resource manager 1120, and a tracking parameter manager 1125. Each of these modules may communicate, directly or indirectly, with one another (e.g., via one or more buses).

The first resource manager 1110 may transmit, via a system information message, a first indication of a first set of resources for a RACH. In some examples, the first resource manager 1110 may transmit a system information message indicating a first set of resources configured for a first time duration for a RACH. In some cases, the first set of resources include a default set of resources for the RACH.

The random access request reception component 1115 may receive, from a UE, a random access request via a first resource of the first set of resources. In some examples, the random access request reception component 1115 may receive a second random access request via a second resource of a second set of resources. In some examples, the random access request reception component 1115 may receive, from a UE, a random access request via a resource selected from the first set of resources or the second set of resources based on being within the first time duration or the second time duration.

The second resource manager 1120 may identify a second set of resources for the RACH based on receiving the random access request. In some examples, the second resource manager 1120 may transmit, to the UE and in response to receiving the random access request, a second indication of the second set of resources.

In some examples, the second resource manager 1120 may identify a second set of resources configured for a second time duration for the RACH, the second set of resources different than the first set of resources and the second time duration different than the first time duration. In some examples, the second resource manager 1120 may transmit an indication of the second set of resources.

In some examples, the second resource manager 1120 may transmit, via the system information message, an indication of one or more sets of resources for the RACH, the one or more sets of resources different than the first set of resources and including the second set of resources. In some examples, the second resource manager 1120 may transmit, via the second indication, an indication of at least one set of the one or more sets of resources, the at least one set of resources including the second set of resources. In some cases, the indication of the at least one set of resources includes a field dedicated to indicating the at least one set of resources. In some cases, the indication of the at least one set of resources includes a field indicating one or more other parameters for transmitting the second random access request. In some cases, the second indication includes information about time resources and frequency resources, one or more frequency carriers, or any combination thereof of the second set of resources.

In some examples, the second resource manager 1120 may transmit, via a field of the second indication, an indication of a backoff time associated with the first set of resources, where receiving the second random access request is based on the backoff time. In some cases, the second indication includes a random access response, a control message, configuration signaling, or any combination thereof.

In some examples, the second resource manager 1120 may determine a modified RA-RNTI associated with a random access response to the second random access request based on receiving the second random access request via the second set of resources. In some examples, the second resource manager 1120 may transmit a second system information message within a time window before the second set of resources, the second system information message including the indication of the second set of resources. In some examples, the second resource manager 1120 may transmit a MIB indicating whether the second system information message is active, where transmitting the indication is based on whether the second system information message is active. In some cases, a RAPID for a random access response is based on whether an associated random access request is received via the first set of resources or the second set of resources. In some cases, the indication of the second set of resources includes a portion of the system information message. In some cases, the indication of the second set of resources includes a second system information message.

In some cases, the second set of resources is based on a congestion associated with a network. In some cases, the second set of resources is based on one or more coverage levels, one or more communication beams, one or more frequency carriers, or any combination thereof associated with the second set of resources. In some cases, the second set of resources includes the first set of resources.

In some cases, the second time duration for using the second set of resources is within the first time duration associated with the default set of resources. In some cases, the first time duration and the second time duration each include one or more frame numbers.

The tracking parameter manager 1125 may transmit a threshold for a tracking parameter to determine when to cease random access request transmissions using the second set of resources, where receiving the second random access request is based on transmitting the threshold. In some cases, the tracking parameter includes a counter that represents a quantity of retransmissions of the random access request. In some cases, the tracking parameter includes a timer that represents a quantity of time that the second set of resources is available for the random access request transmissions via the second set of resources.

Figure 12:
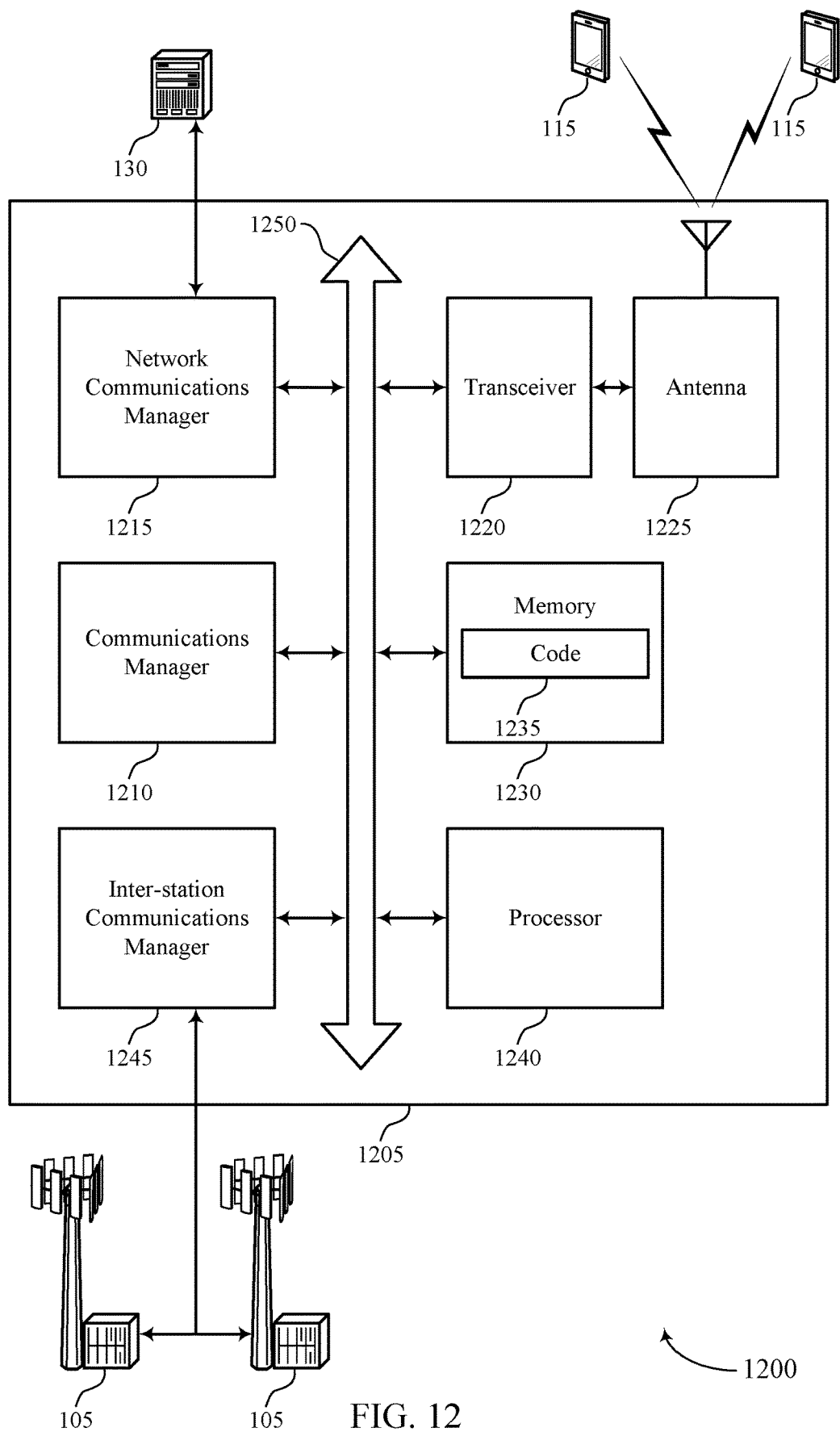
FIG. 12 shows a diagram of a system including a device that supports random access resources based on network conditions in accordance with aspects of the present disclosure.

FIG. 12 shows a diagram of a system 1200 including a device 1205 that supports random access resources based on network conditions in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit, via a system information message, a first indication of a first set of resources for a RACH, receive, from a UE, a random access request via a first resource of the first set of resources, identify a second set of resources for the RACH based on receiving the random access request, transmit, to the UE and in response to receiving the random access request, a second indication of the second set of resources, and receive a second random access request via a second resource of the second set of resources.

The communications manager 1210 may also transmit a system information message indicating a first set of resources configured for a first time duration for a RACH, identify a second set of resources configured for a second time duration for the RACH, the second set of resources different than the first set of resources and the second time duration different than the first time duration, transmit an indication of the second set of resources, and receive, from a UE, a random access request via a resource selected from the first set of resources or the second set of resources based on being within the first time duration or the second time duration.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting random access resources based on network conditions).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
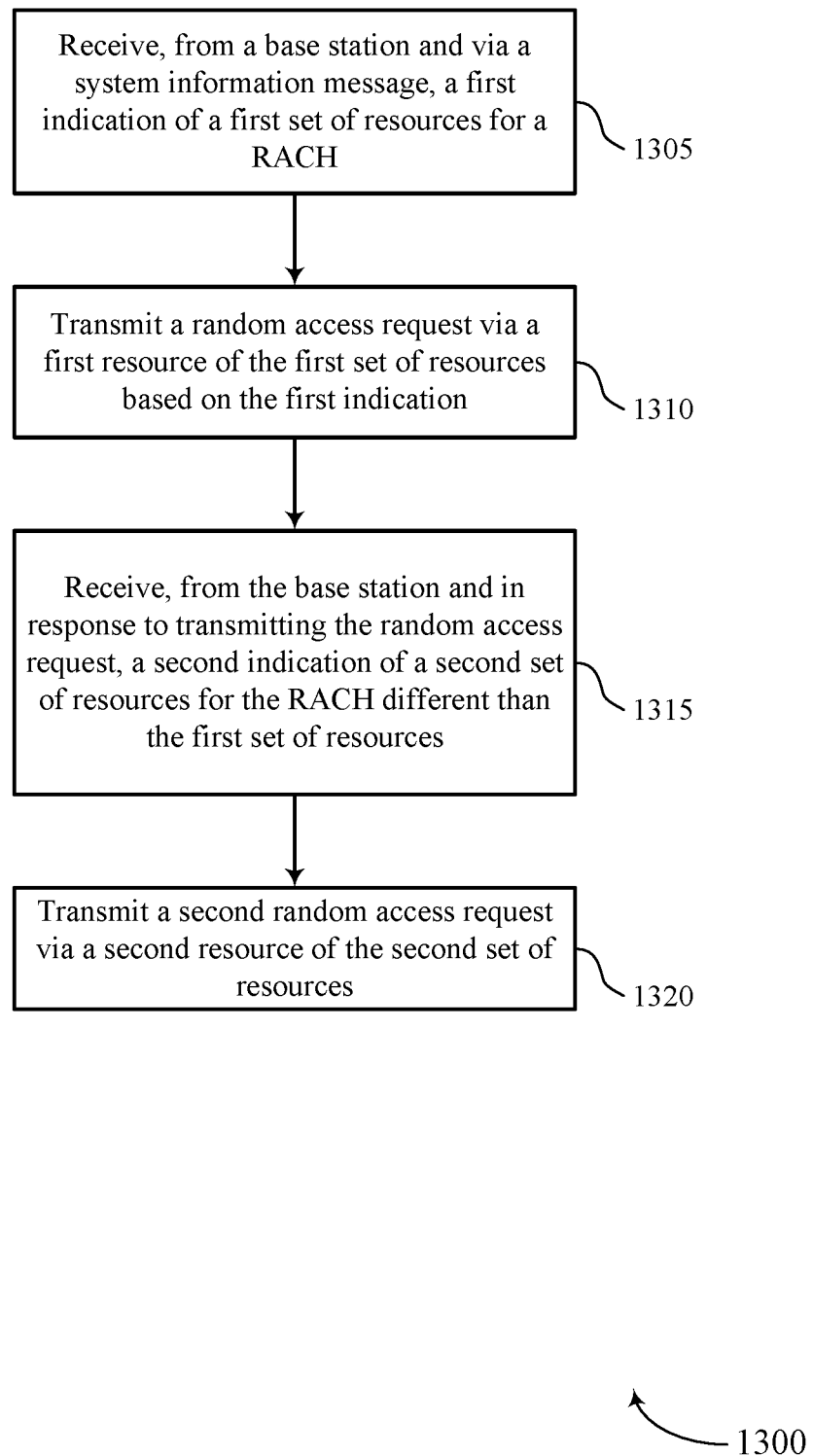
FIGS. 13 through 16 show flowcharts illustrating methods that support random access resources based on network conditions in accordance with aspects of the present disclosure.

FIG. 13 shows a flowchart illustrating a method 1300 that supports random access resources based on network conditions in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive, from a base station and via a system information message, a first indication of a first set of resources for a RACH. The operations of 1305 may be performed according to the methods described herein. In some examples, aspects of the operations of 1305 may be performed by a first resource component as described with reference to FIGS. 5 through 8.

At 1310, the UE may transmit a random access request via a first resource of the first set of resources based on the first indication. The operations of 1310 may be performed according to the methods described herein. In some examples, aspects of the operations of 1310 may be performed by a random access request transmission component as described with reference to FIGS. 5 through 8.

At 1315, the UE may receive, from the base station and in response to transmitting the random access request, a second indication of a second set of resources for the RACH different than the first set of resources. The operations of 1315 may be performed according to the methods described herein. In some examples, aspects of the operations of 1315 may be performed by a second resource component as described with reference to FIGS. 5 through 8.

At 1320, the UE may transmit a second random access request via a second resource of the second set of resources. The operations of 1320 may be performed according to the methods described herein. In some examples, aspects of the operations of 1320 may be performed by a random access request transmission component as described with reference to FIGS. 5 through 8.

Figure 14:
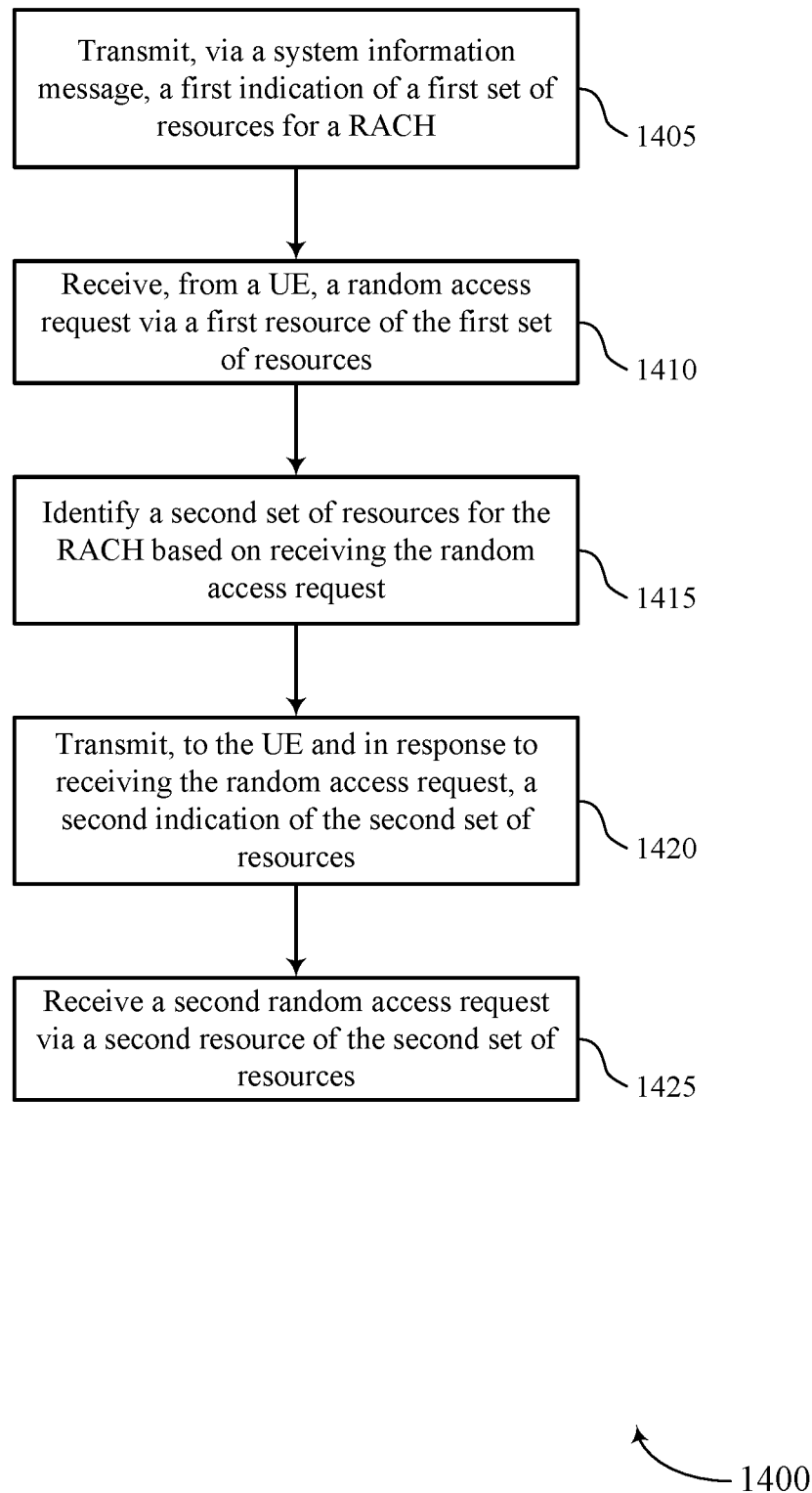

FIG. 14 shows a flowchart illustrating a method 1400 that supports random access resources based on network conditions in accordance with aspects of the present disclosure. The operations of method 1400 may be implemented by a base station 105 or its components as described herein. For example, the operations of method 1400 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1405, the base station may transmit, via a system information message, a first indication of a first set of resources for a RACH. The operations of 1405 may be performed according to the methods described herein. In some examples, aspects of the operations of 1405 may be performed by a first resource manager as described with reference to FIGS. 9 through 12.

At 1410, the base station may receive, from a UE, a random access request via a first resource of the first set of resources. The operations of 1410 may be performed according to the methods described herein. In some examples, aspects of the operations of 1410 may be performed by a random access request reception component as described with reference to FIGS. 9 through 12.

At 1415, the base station may identify a second set of resources for the RACH based on receiving the random access request. The operations of 1415 may be performed according to the methods described herein. In some examples, aspects of the operations of 1415 may be performed by a second resource manager as described with reference to FIGS. 9 through 12.

At 1420, the base station may transmit, to the UE and in response to receiving the random access request, a second indication of the second set of resources. The operations of 1420 may be performed according to the methods described herein. In some examples, aspects of the operations of 1420 may be performed by a second resource manager as described with reference to FIGS. 9 through 12.

At 1425, the base station may receive a second random access request via a second resource of the second set of resources. The operations of 1425 may be performed according to the methods described herein. In some examples, aspects of the operations of 1425 may be performed by a random access request reception component as described with reference to FIGS. 9 through 12.

Figure 15:
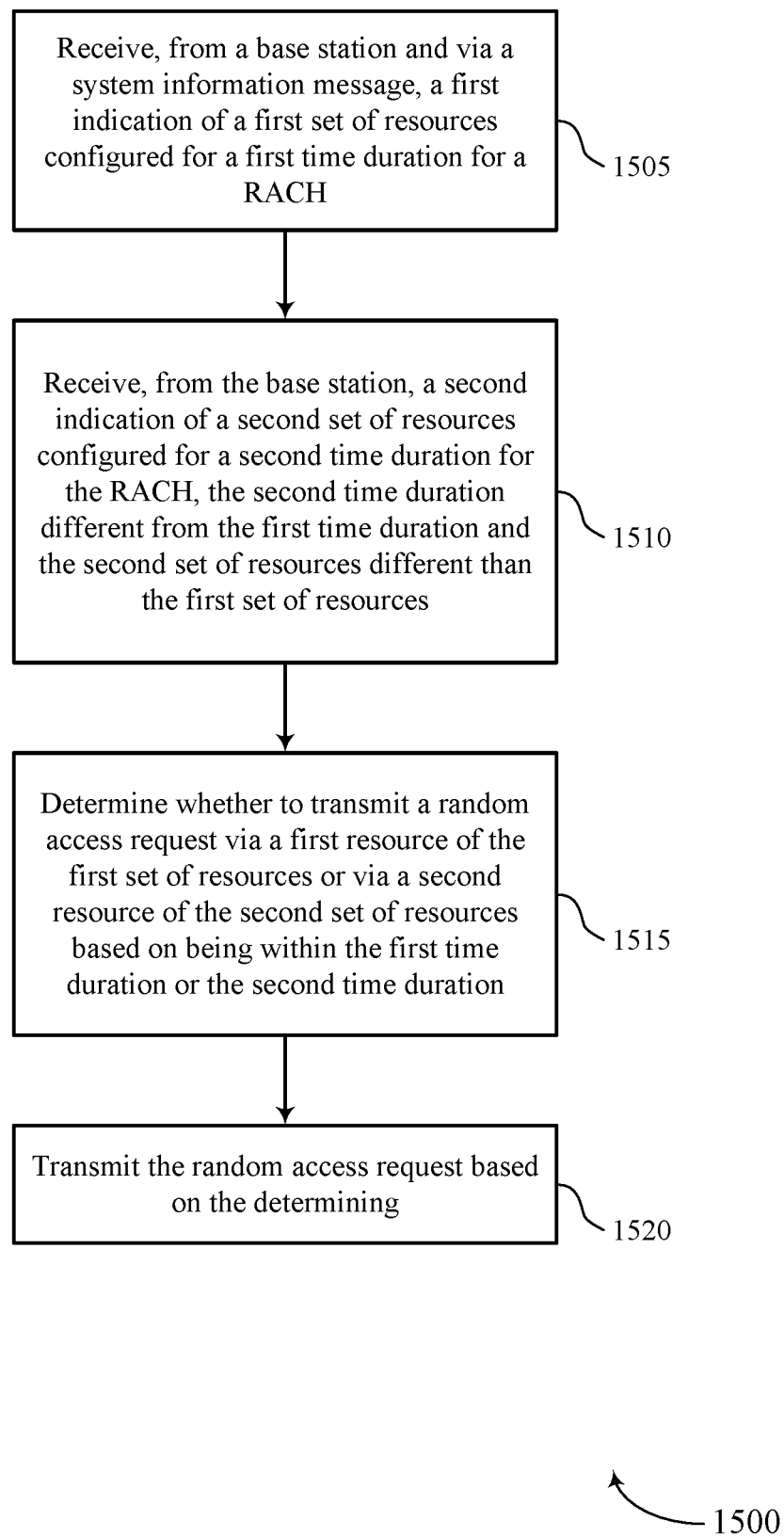

FIG. 15 shows a flowchart illustrating a method 1500 that supports random access resources based on network conditions in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station and via a system information message, a first indication of a first set of resources configured for a first time duration for a RACH. The operations of 1505 may be performed according to the methods described herein. In some examples, aspects of the operations of 1505 may be performed by a first resource component as described with reference to FIGS. 5 through 8.

At 1510, the UE may receive, from the base station, a second indication of a second set of resources configured for a second time duration for the RACH, the second time duration different from the first time duration and the second set of resources different than the first set of resources. The operations of 1510 may be performed according to the methods described herein. In some examples, aspects of the operations of 1510 may be performed by a second resource component as described with reference to FIGS. 5 through 8.

At 1515, the UE may determine whether to transmit a random access request via a first resource of the first set of resources or via a second resource of the second set of resources based on being within the first time duration or the second time duration. The operations of 1515 may be performed according to the methods described herein. In some examples, aspects of the operations of 1515 may be performed by a time duration component as described with reference to FIGS. 5 through 8.

At 1520, the UE may transmit the random access request based on the determining. The operations of 1520 may be performed according to the methods described herein. In some examples, aspects of the operations of 1520 may be performed by a random access request transmission component as described with reference to FIGS. 5 through 8.

Figure 16:
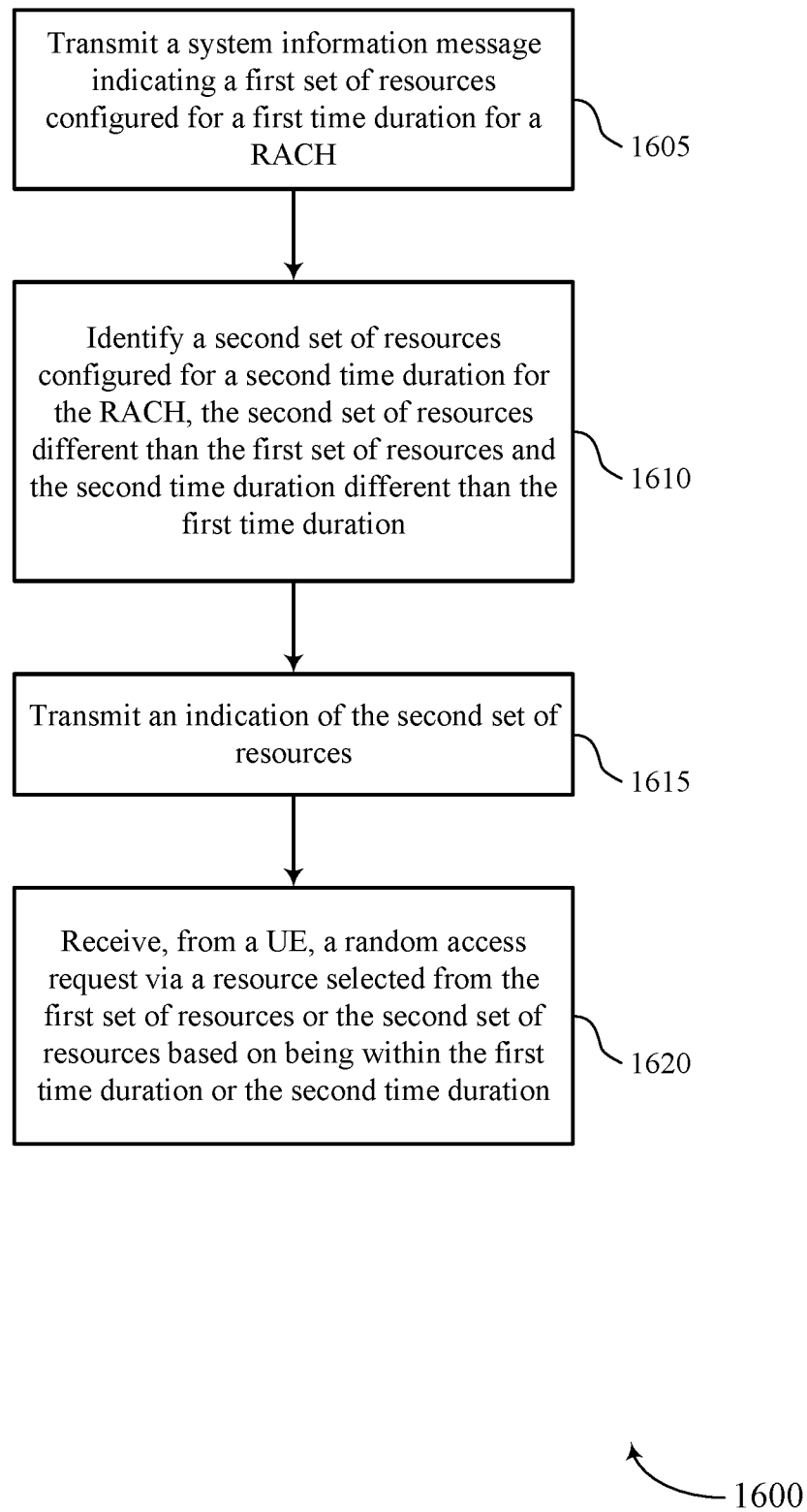

FIG. 16 shows a flowchart illustrating a method 1600 that supports random access resources based on network conditions in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may transmit a system information message indicating a first set of resources configured for a first time duration for a RACH. The operations of 1605 may be performed according to the methods described herein. In some examples, aspects of the operations of 1605 may be performed by a first resource manager as described with reference to FIGS. 9 through 12.

At 1610, the base station may identify a second set of resources configured for a second time duration for the RACH, the second set of resources different than the first set of resources and the second time duration different than the first time duration. The operations of 1610 may be performed according to the methods described herein. In some examples, aspects of the operations of 1610 may be performed by a second resource manager as described with reference to FIGS. 9 through 12.

At 1615, the base station may transmit an indication of the second set of resources. The operations of 1615 may be performed according to the methods described herein. In some examples, aspects of the operations of 1615 may be performed by a second resource manager as described with reference to FIGS. 9 through 12.

At 1620, the base station may receive, from a UE, a random access request via a resource selected from the first set of resources or the second set of resources based on being within the first time duration or the second time duration. The operations of 1620 may be performed according to the methods described herein. In some examples, aspects of the operations of 1620 may be performed by a random access request reception component as described with reference to FIGS. 9 through 12.

The following provides an overview of aspects of the present disclosure:

Aspect 1: A method for wireless communication at a UE, comprising: receiving, from a base station and via a system information message, a first indication of a first set of resources for a RACH; transmitting a random access request via a first resource of the first set of resources based at least in part on the first indication; receiving, from the base station and in response to transmitting the random access request, a second indication of a second set of resources for the RACH different than the first set of resources; and transmitting a second random access request via a second resource of the second set of resources.

Aspect 2: The method of aspect 1, wherein the second set of resources is based at least in part on a congestion associated with a network.

Aspect 3: The method of any of aspects 1 through 2, further comprising: receiving, via the system information message, an indication of one or more sets of resources for the RACH, the one or more sets of resources different than the first set of resources and comprising the second set of resources; and receiving, via the second indication, an indication of at least one set of the one or more sets of resources, the at least one set of resources comprising the second set of resources.

Aspect 4: The method of aspect 3, wherein the indication of the at least one set of resources comprises a field dedicated to indicating the at least one set of resources.

Aspect 5: The method of any of aspects 3 through 4, wherein the indication of the at least one set of resources comprises a field indicating one or more other parameters for transmitting the second random access request.

Aspect 6: The method of any of aspects 3 through 5, wherein the second set of resources is based at least in part on one or more coverage levels, one or more communication beams, one or more frequency carriers, or any combination thereof associated with the second set of resources.

Aspect 7: The method of any of aspects 1 through 6, wherein the second indication comprises information about time resources and frequency resources, one or more frequency carriers, or any combination thereof of the second set of resources.

Aspect 8: The method of any of aspects 1 through 7, further comprising: using a tracking parameter to determine when to cease random access request transmissions using the second set of resources based at least in part on receiving the second indication, wherein transmitting the second random access request is based at least in part on initiating the tracking parameter.

Aspect 9: The method of aspect 8, further comprising: determining that the tracking parameter satisfies a threshold based at least in part on initiating the tracking parameter; and transmitting a third random access request via a third resource of the first set of resources based at least in part on the tracking parameter satisfying the threshold.

Aspect 10: The method of aspect 9, further comprising: receiving the threshold via the second indication, the system information message, or any combination thereof, wherein determining that the tracking parameter is satisfied is based at least in part on receiving the threshold.

Aspect 11: The method of any of aspects 8 through 10, further comprising: modifying a value of the tracking parameter based at least in part on transmitting the second random access request, wherein the tracking parameter comprises a counter that represents a quantity of retransmissions of the random access request.

Aspect 12: The method of any of aspects 8 through 10, wherein the tracking parameter comprises a timer that represents a quantity of time that the second set of resources is available for the random access request transmissions via the second set of resources.

Aspect 13: The method of any of aspects 8 through 12, further comprising: receiving, from the base station and based at least in part on transmitting the second random access request, a third indication of a third set of resources for the RACH different than the first set of resources; and restarting the tracking parameter based at least in part on receiving the third indication.

Aspect 14: The method of any of aspects 1 through 13, further comprising: identifying a first backoff time associated with the first set of resources based at least in part on receiving the second indication; and adjusting the first backoff time to a second backoff time for the second set of resources using a scaling factor, wherein transmitting the second random access request in based at least in part on the second backoff time.

Aspect 15: The method of aspect 14, further comprising: selecting a resource included in the first set of resources and the second set of resources for transmission of the second random access request; and setting the second backoff time to the first backoff time based at least in part on the resource being included in the first set of resources and the second set of resources.

Aspect 16: The method of any of aspects 1 through 13, further comprising: identifying a backoff time for the second set of resources based at least in part on a field of the second indication, the field comprising an indication of the second set of resources and the backoff time, wherein transmitting the second random access request in based at least in part on the backoff time.

Aspect 17: The method of any of aspects 1 through 13, further comprising: identifying a backoff time associated with the first set of resources based at least in part on receiving the second indication; and refraining from using the backoff time for the second set of resources based at least in part on receiving the second indication of the second set of resources, wherein transmitting the second random access request in based at least in part on the refraining.

Aspect 18: The method of any of aspects 1 through 17, wherein a field that includes the second indication of the second set of resources further comprises a backoff indicator that indicates a backoff time associated with retransmissions of the random access request using the first set of resources.

Aspect 19: The method of any of aspects 1 through 17, wherein a first field of a message includes the second indication of the second set of resources; and a second field of the message includes a backoff indicator that indicates a backoff time associated with retransmissions of the random access request using the first set of resources.

Aspect 20: The method of any of aspects 1 through 19, further comprising: determining a transmit power for the second random access request based at least in part on using the second set of resources, wherein transmitting the second random access request is based at least in part on determining the transmit power; and determining a value of a counter for the second random access request based at least in part on using the second set of resources, wherein the counter represents a quantity of random access request transmissions, wherein transmitting the second random access request is based at least in part on determining the value of the counter.

Aspect 21: The method of aspect 20, wherein determining the transmit power for the second random access request comprises: increasing the transmit power of the second random access request as compared with a transmit power associated with transmission of the random access request; or using a same transmit power for the second random access request as the transmit power associated with transmission of the random access request.

Aspect 22: The method of any of aspects 20 through 21, wherein the transmit power for the second random access request is based at least in part on the counter for the transmit power.

Aspect 23: The method of any of aspects 20 through 22, wherein determining the value of the counter for the second random access request comprises: incrementing the value of the counter after transmitting the random access request; or maintaining the value of the counter after transmitting the random access request.

Aspect 24: The method of aspect 20, wherein determining the value of the counter for the second random access request comprises: determining to reset the value of the counter based at least in part on receiving the second indication.

Aspect 25: The method of any of aspects 1 through 24, further comprising: determining a coverage enhancement level for the second random access request based at least in part on using the second set of resources, wherein transmitting the second random access request is based at least in part on determining the coverage enhancement level.

Aspect 26: The method of aspect 25, wherein determining the coverage enhancement level for the second random access request comprises: increasing the coverage enhancement level of the second random access request as compared with a coverage enhancement level associated with transmission of the random access request; or; and using a same coverage enhancement level for the second random access request as the coverage enhancement level associated with transmission of the random access request.

Aspect 27: The method of any of aspects 25 through 26, wherein the coverage enhancement level for the second random access request is based at least in part on a value of a counter for the coverage enhancement level.

Aspect 28: The method of any of aspects 1 through 27, wherein transmitting the second random access request via the second resource of the second set of resources is based at least in part on a type of the UE, a capability of the UE, an access class of the UE, a traffic type of communications at the UE, or any combination thereof.

Aspect 29: The method of any of aspects 1 through 28, wherein the second set of resources includes the first set of resources.

Aspect 30: The method of any of aspects 1 through 29, wherein the second indication comprises a random access response, a control message, configuration signaling, or any combination thereof.

Aspect 31: The method of any of aspects 1 through 30, further comprising: determining a modified RA-RNTI associated with a random access response to the second random access request based at least in part on transmitting the second random access request via the second set of resources.

Aspect 32: The method of any of aspects 1 through 31, wherein a RAPID for a random access response is based at least in part on whether an associated random access request is transmitted via the first set of resources or the second set of resources.

Aspect 33: A method for wireless communication at a base station, comprising: transmitting, via a system information message, a first indication of a first set of resources for a RACH; receiving, from a UE, a random access request via a first resource of the first set of resources; identifying a second set of resources for the RACH based at least in part on receiving the random access request; transmitting, to the UE and in response to receiving the random access request, a second indication of the second set of resources; and receiving a second random access request via a second resource of the second set of resources.

Aspect 34: The method of aspect 33, wherein the second set of resources is based at least in part on a congestion associated with a network.

Aspect 35: The method of any of aspects 33 through 34, further comprising: transmitting, via the system information message, an indication of one or more sets of resources for the RACH, the one or more sets of resources different than the first set of resources and comprising the second set of resources; and transmitting, via the second indication, an indication of at least one set of the one or more sets of resources, the at least one set of resources comprising the second set of resources.

Aspect 36: The method of aspect 35, wherein the indication of the at least one set of resources comprises a field dedicated to indicating the at least one set of resources.

Aspect 37: The method of any of aspects 35 through 36, wherein the indication of the at least one set of resources comprises a field indicating one or more other parameters for transmitting the second random access request.

Aspect 38: The method of any of aspects 35 through 37, wherein the second set of resources is based at least in part on one or more coverage levels, one or more communication beams, one or more frequency carriers, or any combination thereof associated with the second set of resources.

Aspect 39: The method of any of aspects 33 through 38, wherein the second indication comprises information about time resources and frequency resources, one or more frequency carriers, or any combination thereof of the second set of resources.

Aspect 40: The method of any of aspects 33 through 39, further comprising: transmitting a threshold for a tracking parameter to determine when to cease random access request transmissions using the second set of resources, wherein receiving the second random access request is based at least in part on transmitting the threshold.

Aspect 41: The method of aspect 40, wherein the tracking parameter comprises a counter that represents a quantity of retransmissions of the random access request.

Aspect 42: The method of aspect 40, wherein the tracking parameter comprises a timer that represents a quantity of time that the second set of resources is available for the random access request transmissions via the second set of resources.

Aspect 43: The method of any of aspects 33 through 42, further comprising: transmitting, via a field of the second indication, an indication of a backoff time associated with the first set of resources, wherein receiving the second random access request is based at least in part on the backoff time.

Aspect 44: The method of any of aspects 33 through 43, wherein the second set of resources includes the first set of resources.

Aspect 45: The method of any of aspects 33 through 44, wherein the second indication comprises a random access response, a control message, configuration signaling, or any combination thereof.

Aspect 46: The method of any of aspects 33 through 45, further comprising: determining a modified RA-RNTI associated with a random access response to the second random access request based at least in part on receiving the second random access request via the second set of resources.

Aspect 47: The method of any of aspects 33 through 46, wherein a RAPID for a random access response is based at least in part on whether an associated random access request is received via the first set of resources or the second set of resources.

Aspect 48: A method for wireless communication at a UE, comprising: receiving, from a base station and via a system information message, a first indication of a first set of resources configured for a first time duration for a RACH; receiving, from the base station, a second indication of a second set of resources configured for a second time duration for the RACH, the second time duration different from the first time duration and the second set of resources different than the first set of resources; determining whether to transmit a random access request via a first resource of the first set of resources or via a second resource of the second set of resources based at least in part on being within the first time duration or the second time duration; and transmitting the random access request based at least in part on the determining.

Aspect 49: The method of aspect 48, wherein the second set of resources is based at least in part on a congestion associated with a network.

Aspect 50: The method of any of aspects 48 through 49, further comprising: monitoring for a second system information message within a time window before transmitting the random access request, wherein receiving the second indication of the second set of resources is based at least in part on monitoring for the second system information message.

Aspect 51: The method of aspect 50, further comprising: receiving a MIB indicating whether the second system information message is active, wherein receiving the second indication is based at least in part on whether the second system information message is active.

Aspect 52: The method of any of aspects 48 through 51, wherein the first set of resources comprises a default set of resources for the RACH; and the second time duration for using the second set of resources is within the first time duration associated with the default set of resources.

Aspect 53: The method of any of aspects 48 through 52, wherein the second indication of the second set of resources comprises a portion of the system information message.

Aspect 54: The method of any of aspects 48 through 52, wherein the second indication of the second set of resources comprises a second system information message.

Aspect 55: The method of any of aspects 48 through 54, wherein the first time duration and the second time duration each comprise one or more frame numbers.

Aspect 56: A method for wireless communication at a base station, comprising: transmitting a system information message indicating a first set of resources configured for a first time duration for a RACH; identifying a second set of resources configured for a second time duration for the RACH, the second set of resources different than the first set of resources and the second time duration different than the first time duration; transmitting an indication of the second set of resources; and receiving, from a UE, a random access request via a resource selected from the first set of resources or the second set of resources based at least in part on being within the first time duration or the second time duration.

Aspect 57: The method of aspect 56, wherein the second set of resources is based at least in part on a congestion associated with a network.

Aspect 58: The method of any of aspects 56 through 57, wherein the first set of resources comprise a default set of resources for the RACH; and the second time duration for using the second set of resources is within the first time duration associated with the default set of resources.

Aspect 59: The method of any of aspects 56 through 58, wherein the indication of the second set of resources comprises a portion of the system information message.

Aspect 60: The method of any of aspects 56 through 58, wherein the indication of the second set of resources comprises a second system information message.

Aspect 61: The method of any of aspects 56 through 60, wherein transmitting the indication of the second set of resources comprises: transmitting a second system information message within a time window before the second set of resources, the second system information message comprising the indication of the second set of resources.

Aspect 62: The method of aspect 61, further comprising: transmitting a MIB indicating whether the second system information message is active, wherein transmitting the indication is based at least in part on whether the second system information message is active.

Aspect 63: The method of any of aspects 56 through 62, wherein the first time duration and the second time duration each comprise one or more frame numbers.

Aspect 64: An apparatus for wireless communication at a UE, comprising a processor; memory coupled with the processor; and instructions stored in the memory and executable by the processor to cause the apparatus to perform a method of any of aspects 1 through 32.

Aspect 65: An apparatus for wireless communication at a UE, comprising at least one means for performing a method of any of aspects 1 through 32.

Aspect 66: A non-transitory computer-readable medium storing code for wireless communication at a UE, the code comprising instructions executable by a processor to perform a method of any of aspects 1 through 32.

Aspect 67: An apparatus for wireless communication at a base station, comprising a processor; memory coupled with the processor; and instructions stored in the memory and executable by the processor to cause the apparatus to perform a method of any of aspects 33 through 47.

Aspect 68: An apparatus for wireless communication at a base station, comprising at least one means for performing a method of any of aspects 33 through 47.

Aspect 69: A non-transitory computer-readable medium storing code for wireless communication at a base station, the code comprising instructions executable by a processor to perform a method of any of aspects 33 through 47.

Aspect 70: An apparatus for wireless communication at a UE, comprising a processor; memory coupled with the processor; and instructions stored in the memory and executable by the processor to cause the apparatus to perform a method of any of aspects 48 through 55.

Aspect 71: An apparatus for wireless communication at a UE, comprising at least one means for performing a method of any of aspects 48 through 55.

Aspect 72: A non-transitory computer-readable medium storing code for wireless communication at a UE, the code comprising instructions executable by a processor to perform a method of any of aspects 48 through 55.

Aspect 73: An apparatus for wireless communication at a base station, comprising a processor; memory coupled with the processor; and instructions stored in the memory and executable by the processor to cause the apparatus to perform a method of any of aspects 56 through 63.

Aspect 74: An apparatus for wireless communication at a base station, comprising at least one means for performing a method of any of aspects 56 through 63.

Aspect 75: A non-transitory computer-readable medium storing code for wireless communication at a base station, the code comprising instructions executable by a processor to perform a method of any of aspects 56 through 63.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
receiving, from a base station and via a system information message, a first indication of a first set of resources for a random access channel;
transmitting a random access request via a first resource of the first set of resources based at least in part on the first indication;
receiving, from the base station and in response to transmitting the random access request, a second indication of a second set of resources for the random access channel different than the first set of resources; and
transmitting a second random access request via a second resource of the second set of resources.

2. The method of claim 1, wherein the second set of resources is based at least in part on a congestion associated with a network.

3. The method of claim 1, further comprising:
receiving, via the system information message, an indication of one or more sets of resources for the random access channel, the one or more sets of resources different than the first set of resources and comprising the second set of resources; and
receiving, via the second indication, an indication of at least one set of the one or more sets of resources, the at least one set of resources comprising the second set of resources.

4. The method of claim 1, further comprising:
using a tracking parameter to determine when to cease random access request transmissions using the second set of resources based at least in part on receiving the second indication, wherein transmitting the second random access request is based at least in part on initiating the tracking parameter.

5. The method of claim 4, further comprising:
determining that the tracking parameter satisfies a threshold based at least in part on initiating the tracking parameter; and
transmitting a third random access request via a third resource of the first set of resources based at least in part on the tracking parameter satisfying the threshold.

6. The method of claim 4, further comprising:
receiving, from the base station and based at least in part on transmitting the second random access request, a third indication of a third set of resources for the random access channel different than the first set of resources; and
restarting the tracking parameter based at least in part on receiving the third indication.

7. The method of claim 1, further comprising:
identifying a first backoff time associated with the first set of resources based at least in part on receiving the second indication; and
adjusting the first backoff time to a second backoff time for the second set of resources using a scaling factor, wherein transmitting the second random access request in based at least in part on the second backoff time.

8. The method of claim 7, further comprising:
selecting a resource included in the first set of resources and the second set of resources for transmission of the second random access request; and
setting the second backoff time to the first backoff time based at least in part on the resource being included in the first set of resources and the second set of resources.

9. The method of claim 1, further comprising:
identifying a backoff time for the second set of resources based at least in part on a field of the second indication, the field comprising an indication of the second set of resources and the backoff time, wherein transmitting the second random access request in based at least in part on the backoff time.

10. The method of claim 1, further comprising:
identifying a backoff time associated with the first set of resources based at least in part on receiving the second indication; and
refraining from using the backoff time for the second set of resources based at least in part on receiving the second indication of the second set of resources, wherein transmitting the second random access request in based at least in part on the refraining.

11. The method of claim 1, wherein a field that includes the second indication of the second set of resources further comprises a backoff indicator that indicates a backoff time associated with retransmissions of the random access request using the first set of resources.

12. The method of claim 1, wherein:
a first field of a message includes the second indication of the second set of resources; and
a second field of the message includes a backoff indicator that indicates a backoff time associated with retransmissions of the random access request using the first set of resources.

13. The method of claim 1, further comprising:
determining a transmit power for the second random access request based at least in part on using the second set of resources, wherein transmitting the second random access request is based at least in part on determining the transmit power; and
determining a value of a counter for the second random access request based at least in part on using the second set of resources, wherein the counter represents a quantity of random access request transmissions, wherein transmitting the second random access request is based at least in part on determining the value of the counter.

14. The method of claim 1, further comprising:
determining a coverage enhancement level for the second random access request based at least in part on using the second set of resources, wherein transmitting the second random access request is based at least in part on determining the coverage enhancement level.

15. The method of claim 1, further comprising:
determining a modified random access radio network temporary identifier associated with a random access response to the second random access request based at least in part on transmitting the second random access request via the second set of resources.

16. The method of claim 1, wherein a random access preamble identifier for a random access response is based at least in part on whether an associated random access request is transmitted via the first set of resources or the second set of resources.

17. A method for wireless communication at a base station, comprising:
transmitting, via a system information message, a first indication of a first set of resources for a random access channel;
receiving, from a user equipment (UE), a random access request via a first resource of the first set of resources;
identifying a second set of resources for the random access channel based at least in part on receiving the random access request;
transmitting, to the UE and in response to receiving the random access request, a second indication of the second set of resources; and
receiving a second random access request via a second resource of the second set of resources.

18. The method of claim 17, further comprising:
transmitting, via the system information message, an indication of one or more sets of resources for the random access channel, the one or more sets of resources different than the first set of resources and comprising the second set of resources; and
transmitting, via the second indication, an indication of at least one set of the one or more sets of resources, the at least one set of resources comprising the second set of resources.

19. The method of claim 17, further comprising:
transmitting a threshold for a tracking parameter to determine when to cease random access request transmissions using the second set of resources, wherein receiving the second random access request is based at least in part on transmitting the threshold.

20. The method of claim 17, further comprising:
transmitting, via a field of the second indication, an indication of a backoff time associated with the first set of resources, wherein receiving the second random access request is based at least in part on the backoff time.

21. The method of claim 17, further comprising:
determining a modified random access radio network temporary identifier associated with a random access response to the second random access request based at least in part on receiving the second random access request via the second set of resources.

22. The method of claim 17, wherein a random access preamble identifier for a random access response is based at least in part on whether an associated random access request is received via the first set of resources or the second set of resources.

23. A method for wireless communication at a user equipment (UE), comprising:
receiving, from a base station and via a system information message, a first indication of a first set of resources configured for a first time duration for a random access channel;
receiving, from the base station, a second indication of a second set of resources configured for a second time duration for the random access channel, the second time duration different from the first time duration and the second set of resources different than the first set of resources;
determining whether to transmit a random access request via a first resource of the first set of resources or via a second resource of the second set of resources based at least in part on being within the first time duration or the second time duration; and
transmitting the random access request based at least in part on the determining.

24. The method of claim 23, further comprising:
monitoring for a second system information message within a time window before transmitting the random access request, wherein receiving the second indication of the second set of resources is based at least in part on monitoring for the second system information message.

25. The method of claim 24, further comprising:
receiving a master information block indicating whether the second system information message is active, wherein receiving the second indication is based at least in part on whether the second system information message is active.

26. The method of claim 23, wherein:
the first set of resources comprise a default set of resources for the random access channel; and
the second time duration for using the second set of resources is within the first time duration associated with the default set of resources.

27. A method for wireless communication at a base station, comprising:
transmitting a system information message indicating a first set of resources configured for a first time duration for a random access channel;
identifying a second set of resources configured for a second time duration for the random access channel, the second set of resources different than the first set of resources and the second time duration different than the first time duration;
transmitting an indication of the second set of resources; and
receiving, from a user equipment (UE), a random access request via a resource selected from the first set of resources or the second set of resources based at least in part on being within the first time duration or the second time duration.

28. The method of claim 27, wherein:
- the first set of resources comprise a default set of resources for the random access channel; and
- the second time duration for using the second set of resources is within the first time duration associated with the default set of resources.

29. The method of claim 27, wherein transmitting the indication of the second set of resources comprises:
- transmitting a second system information message within a time window before the second set of resources, the second system information message comprising the indication of the second set of resources.

30. The method of claim 29, further comprising:
- transmitting a master information block indicating whether the second system information message is active, wherein transmitting the indication is based at least in part on whether the second system information message is active.

* * * * *